(12) United States Patent
Nguyen et al.

(10) Patent No.: US 6,806,728 B2
(45) Date of Patent: Oct. 19, 2004

(54) CIRCUIT AND METHOD FOR INTERFACING TO A BUS CHANNEL

(75) Inventors: Huy Nguyen, San Jose, CA (US);
Roxanne Vu, San Jose, CA (US);
Benedict Lau, San Jose, CA (US)

(73) Assignee: Rambus, Inc., Los Altos, CA (US)

( * ) Notice: Subject to any disclaimer, the term of this patent is extended or adjusted under 35 U.S.C. 154(b) by 609 days.

(21) Appl. No.: 09/930,694

(22) Filed: Aug. 15, 2001

(65) Prior Publication Data

US 2003/0189441 A1 Oct. 9, 2003

(51) Int. Cl.[7] .............................................. H03K 17/16
(52) U.S. Cl. ............................ 326/30; 326/83; 326/26
(58) Field of Search ............................. 326/26, 27, 30, 326/82, 83, 86

(56) References Cited

U.S. PATENT DOCUMENTS

| | | | |
|---|---|---|---|
| 4,481,625 A | 11/1984 | Roberts et al. | 370/85 |
| 4,691,127 A | 9/1987 | Huizer | 307/475 |
| 4,860,198 A | 8/1989 | Takenaka | 364/200 |
| 5,107,230 A | 4/1992 | King | 333/32 |
| 5,134,311 A | 7/1992 | Biber et al. | 307/270 |
| 5,194,765 A | 3/1993 | Dunlop et al. | 307/443 |
| 5,254,883 A | * 10/1993 | Horowitz et al. | 326/30 |
| 5,272,396 A | * 12/1993 | Mammano et al. | 326/30 |
| 5,319,755 A | 6/1994 | Farmwald et al. | 395/325 |
| 5,329,184 A | * 7/1994 | Redfern | 326/66 |
| 5,546,042 A | 8/1996 | Tedrow et al. | 327/538 |
| 5,926,031 A | 7/1999 | Wallace et al. | |
| 5,977,797 A | 11/1999 | Gasparik | 326/86 |
| 6,067,594 A | 5/2000 | Perino et al. | 710/126 |
| 6,094,075 A | 7/2000 | Garrett, Jr. et al. | 327/108 |

FOREIGN PATENT DOCUMENTS

| | | |
|---|---|---|
| EP | 0 611 113 | 8/1994 |
| WO | WO 99/10982 | 3/1999 |

OTHER PUBLICATIONS

International Search Report for PCT/US02/24005, Oct. 23, 2003.

* cited by examiner

*Primary Examiner*—Don Le
(74) *Attorney, Agent, or Firm*—McDonnell Boehnen Hulbert & Berghoff LLP

(57) ABSTRACT

A circuit and method for interfacing to a bus via an on-die termination pad are shown. The present invention derives an output low reference voltage from an external terminating voltage and an external reference voltage corresponding to the middle of a logic voltage range. A feedback loop is used to compare a voltage at the pad to the output low reference voltage. An on-die termination current sourced to the pad is adjusted accordingly. This allows the present invention to adapt to a variety of external termination voltages. Further, the output low reference voltage is utilized to generate a reference current sourced to an output amplifier, which causes the output swing of the amplifier to track along with the external terminating voltage and the external reference voltage. In another aspect of the present invention, an alternating pattern of logic high and logic low voltage values is transmitted at the pad and received. The received data pattern is compared to the transmitted data pattern to adjust the on-die termination current and the reference current.

55 Claims, 16 Drawing Sheets

CIRCUIT AND METHOD FOR INTERFACING TO A BUS CHANNEL

FIELD OF THE INVENTION

This present invention relates to digital interface circuitry. More specifically, it relates to on-die termination (ODT) circuitry.

BACKGROUND OF THE INVENTION

Computer systems and other electronic systems typically use buses for interconnecting integrated circuit components so that the integrated circuit components can communicate with one another. System buses typically connect master devices, such as microprocessors and controllers, and slave devices, such as memories and bus transceivers.

Each master and slave device that is coupled to the bus typically includes output driver circuitry for driving signals onto the bus. Prior bus systems have employed a variety of types of logic circuitry including: transistor-transistor logic ("TTL"), emitter-coupled logical ("ECL"), complementary-metal-oxide-semiconductor (CMOS), N-channel metal oxide semiconductor ("NMOS"), P-channel metal oxide semiconductor ("PMOS"), and gunning transistor logic ("GTL").

The different types of logic circuitry described above are generally driven by voltage level signals. For example, a logic-1 in TTL is typically represented by a voltage signal level of 5V while a logic-0 is typically represented by a voltage signal level of 0V. As supply voltage levels for digital circuits have steadily declined from 5V to approximately 1.8V, it has become advantageous, to provide buses that are driven by a current mode output driver. One benefit to a current mode driver is a reduction of peak switching current. For a voltage mode driver the output transistor of the driver must be sized to drive the maximum specified current under worst case operating conditions. Under nominal conditions with less than maximum load, the current transient when the output is switched, but before it reaches the rail, can be very large. The current mode driver, on the other hand, draws a known current regardless of load and operating conditions.

In addition, for a voltage mode driver, impedance discontinuities occur when the driving device is characterized by a low output impedance when in a sending state. These discontinuities cause reflections which dictate extra bus settling time. Current mode drivers, however, are characterized by a high output impedance so that a signal propagating on the bus encounters no significant discontinuity in line impedance due to a driver in a sending state. Thus, reflections are typically avoided and the required bus settling time is decreased.

An example of a current mode bus is disclosed in U.S. Pat. No. 4,481,625, issued Nov. 6, 1984, entitled High Speed Data Bus System. An NMOS current mode driver for a low voltage swing bus is disclosed in PCT international patent application number PCT/US91/02590 filed Apr. 16, 1991, published Oct. 31, 1991, and entitled Integrated Circuit I/O Using a High Performance Bus Interface.

One disadvantage of certain prior current mode drivers is that current sometimes varies from driver to driver. Variations can also happen over time. Temperature variations, process variations, and power supply variations sometimes cause such variations. Current variations in turn lead to voltage level variations on the bus. Bus voltage level variations can in turn lead to the erroneous reading of bus levels, which can result in the loss of data or other errors. In addition, attempts to design around these variations by raising voltage levels sometimes leads to higher power dissipations, especially in extreme cases. In any event, variations in bus voltage levels are typically more problematic for buses with low voltage swings.

FIG. 1 is a functional block diagram illustrating an example of a bus system 10. In this example, a bus 20 provides for data transfer between a memory controller device 30, which is the bus master for bus 20, and RDRAMs 12 and 14, which are slave devices on bus 20. Bus 20 is a high speed, low voltage swing bus that typically includes a plurality of transmission lines for carrying data and control information. Each of memory controller 30 and RDRAMs 12 and 14 typically includes an interface circuit for coupling to bus 20, such as interface driver circuit 32 for memory controller 30. Each interface circuit typically includes a plurality of current mode drivers for driving each line of bus 20, e.g. for each master and slave device, there is one output driver for each transmission line of bus 20. Each of the current mode drivers accurately provides a desired current for the respective line of bus 30.

Each of the current mode drivers typically includes a plurality of transistors coupled in parallel between a respective transmission line of the bus and a ground voltage supply rail. A logic circuit is coupled to the gates of the plurality of transistors. The widths of the transistors are typically binary multiples of one another. A current controller is coupled to the logic circuit for controlling the logic circuit in order to turn on or off a particular combination of the plurality of transistors such that a desired current draw for the line of the bus may be selected. The desired current for the line of the bus, in turn, becomes a desired voltage for the line of bus 20. The controller typically includes a variable level circuit, a comparator, a counter, and a control logic. Once selected, the desired current is relatively independent of power supply, process, and temperature variations. U.S. Pat. No. 5,254,883 to Horowitz et al. for Electrical Current Source Circuitry for a Bus, herein incorporated by reference in its entirety for all purposes, illustrates an example of a circuit for setting a desired current draw for circuitry interfacing with a bus as well as information regarding typical bus systems such as bus system 10.

As noted above, the modern trend for the interface drivers for bus 20 is to use current mode drivers having low voltage swing signals. The current mode drivers of interface driver 32 of memory controller 30 and RDRAMs 12 and 14 control the voltage levels of bus 20. When a current mode driver is in an "off" state, then the respective bus line will either stay at a high voltage level or rise to the high voltage level. When the current mode driver is in an "off" state, there is approximately zero voltage drop across the line termination resistors, represented in FIG. 1 by resistor 26, because the current mode driver is not drawing current from the bus line. Thus, the voltage level of the bus line will rise to the termination voltage $V_{term}$ for bus 20.

When a current mode driver is in an "on" state, then the current mode driver draws current from the respective bus line and lowers the voltage level of the bus line. In other words, when the current mode driver is in an "on" state, pull down current flows through the current driver to the ground supply rail. The low voltage level of bus 20 is, accordingly, determined by the pull down current drawn by the driver. The pull down current flows through the termination resistor 26 causing a voltage drop to appear on the respective line of bus 20. The pull down current (flowing through the output driver and the respective termination resistor) is referred to as the desired current. The magnitude of the desired current can be set or selected by the user to allow for different bus impedance, noise immunity, and power dissipation requirements.

FIG. 5 is a voltage waveform diagram illustrating how the current adjustment performed by the circuits of FIGS. 2 and 4, discussed below, can affect the signal waveform generated by an output driver. In FIG. 5, waveform 180 illustrates a response where an output high voltage level $V_{OH}$ starts at $V_{TERM}$ (typically 1.8 V in many current RAMBUS designs) and is pulled low by the output driver to an output low voltage level $V_{OL}$ (typically 1.0 V in many current RAMBUS designs). At the output high voltage level $V_{OH}$, the output driver circuit draws no current. At the output low voltage level $V_{OL}$, the output driver draws sufficient current to pull the bus line to 1.0V, in this example. When the output current is properly adjusted, then the output voltage swings equally above and below an externally provided reference voltage $V_{REF}$, which is typically 1.4V in current RAMBUS designs. However, if the current draw is insufficient, then curve 184 may occur, where the output voltage does not quite reach the output low voltage level $V_{OL}$. Conversely, if the current draw is excessive, then curve 182 may occur, where the output low voltage level $V_{OL}$ may be exceeded.

In addition to adjusting the desired pull down current for the drivers, it is important to have the appropriate impedance for the driver. The signals driven onto the bus lines of bus 20 are reflected from other interfaces on the bus. For example, when RDRAM 12 transmits onto bus 20, a 400 mV signal is transmitted towards memory controller 30 on bus segment 24 and towards RDRAM 14 on bus segment 22. Because of the high operating speeds of modem bus systems, bus segments 22 and 24 are illustrated here as transmission lines that require time for a signal to traverse. When the signal from RDRAM 12 encounters the termination of interface driver 32 on bus 20, then a portion of the signal is reflected and results in an 800 mV signal, in this example, that is reflected back towards RDRAM 12. An appropriate terminating impedance in driver 32 is important in order to limit the amplitude of the reflected signal. Also, terminating resistor 26 is an external device and typically has a value of approximately 28Ω or 56Ω, which will affect the function of the driver circuits.

FIG. 2 is a functional block diagram that illustrates one example of the current control circuitry present in the interface driver 32 of memory controller 30 and the RDRAM 14 of FIG. 1. In interface driver 32, a voltage drop caused by current drawn by current source 134 coupled in series with external resistor 110 and $V_{TERM}$ is compared to a reference voltage $V_{REF}$ by comparator 120 to generate an UP/DOWN signal. Counter 130 maintains a current control signal CCS1, that is incremented or decremented responsive to the value of the UP/DOWN signal and a clock signal K1. The current control signal CCS1 drives current sources 134 and 136. Current source 134 provides a feedback loop to comparator 120. Current source 136 provides a controlled current draw from data input line IND coupled to bus 20. Likewise, RDRAM 14 includes a counter 140 for producing another current control value CCS2 that controls the current in current source 142 to obtain a current draw from INW coupled to bus 20.

The current drawn by current source 134 will increase until the voltage at both input terminals of comparator 120 is approximately the same. This condition will typically result in the UP/DOWN signal oscillating back and forth as the value of CCS1 adjusts the current flow through current source 134 and the current flow is fed back through comparator 120.

FIG. 3 is a circuit diagram illustrating one example of the implementation for current sources 134 and 136. Here, current control signal CCS1 is composed of six signal lines and current source 136 is implemented as a plurality of NMOS transistors, each signal line of CCS1 driving the gate of one of the transistors. In one approach, each of the transistors is sized proportional to the significance of the bit line of CCS1 that drives it. For example, the transistor driven by CCS1(0), the least significant bit of CCS1, is of a unit size (e.g. the smallest transistor achievable through the fabrication process for the overall circuit), while the transistors driven by CCS1(1) and CCS1(2), the next two most significant bit lines, are twice and four times the unit size, respectively. Other approaches to implementing the current sources are also possible and well understood within the art.

FIG. 4 is a functional block diagram that illustrates another approach to generating a current control signal CCS suitable for controlling the current draw of the interface drivers for an on-die termination (ODT). The circuit 150 of FIG. 4 is configured to improve the output swing of the driver circuit by controlling the current relative to both the output low voltage level $V_{OL}$ and the output high voltage level $V_{OH}$, which may obtained by sampling the two logic states as output by the driver. The output low voltage level $V_{OL}$ is coupled to the output high voltage level $V_{OH}$ through resistors 152 and 154, which have a resistance on the order of 5KΩ. A sampling voltage $V_S$ is obtained at the node where resistors 152 and 154 are coupled. The sampling voltage $V_S$ is compared to the reference voltage $V_{REF}$ by comparator 160 and the output of the comparator is latched by latch 164 under the control of a $CC_{EVAL}$ signal to obtain an UP/DOWN control signal for counter 170.

The voltage level signals $V_{OL}$ and $V_{OH}$ may be obtained during a training sequence for the output driver that is coordinated with the $CC_{EVAL}$ signal, which may, for example, take place as part of a refresh cycle for the RDRAMs 12 and 14 or as part of a power-up cycle. FIG. 4 reflects the approach taken in U.S. Pat. No. 6,094,075 to Garrett, Jr. et al., herein incorporated by reference in its entirety for all purposes. However, any error in the value of resistors 152 and 154 tends to be doubled due to nature of the resistive divider in the design.

SUMMARY OF THE INVENTION

The present invention involves a circuit and method for interfacing to a bus line. The present invention derives an output low reference voltage from an external terminating voltage and an external reference voltage corresponding to the middle of a logic voltage range for the bus line. A feedback loop is used to compare a voltage at the pad to the output low reference voltage. An on-die termination current sourced to the pad is adjusted accordingly. This allows the present invention to adapt to a variety of external termination resistance values. Further, the output low reference voltage is utilized to generate a reference current sourced to an output amplifier, which causes the output swing of the amplifier to track along with the external terminating voltage and the external reference voltage. In another aspect of the present invention, an alternating pattern of logic high and logic low voltage values is transmitted at the pad and received. The received data pattern is compared to the transmitted data pattern to adjust the on-die termination current and the reference current.

One embodiment of a bus interface driver circuit, according to the present invention, includes an external termination pad configured to be coupled to a bus line, the bus line having a termination voltage and a termination impedance, and a first comparator circuit configured to compare the termination voltage to a first reference voltage in order to generate a second reference voltage. A first current source circuit is configured to receive the second reference voltage and generate a reference current that corresponds to the second reference voltage. A driver circuit is configured to receive the reference current and a data signal, where the driver circuit is configured to modulate the reference current responsive to the data signal in order to generate an output current at the external termination pad. A second comparator circuit is configured to compare the termination voltage to the first reference voltage in order to generate a third reference voltage and further compare the third reference voltage to an output voltage at the external termination pad in order to generate a current control signal. Finally, a second current source is configured to receive the current control signal and generate an on-die termination current corresponding to the current control signal at the external termination pad. Another aspect of this embodiment of the present invention involves a transmit pipeline circuit configured to transmit a predetermined data pattern at the external termination pad responsive to a transmit clock signal, the predetermined data pattern alternating between high and low logic voltage levels. This aspect of the present invention also includes a receive pipeline configured to receive, responsive to a receive clock signal, a data pattern at the external termination pad corresponding to the predetermined data pattern transmitted by the transmit pipeline circuit. This aspect of the present invention further includes a comparator configured to compare the received data pattern to the predetermined data pattern in order to generate a counter control signal configured to increase and decrease the current control signal according to the comparison between the received data pattern and the predetermined data pattern.

An embodiment of a method, according to the present invention, for interfacing to a bus calls for providing an external termination pad configured to be coupled to a bus line and tracking a difference between a terminating voltage for the bus and a first reference voltage for the bus to produce a second reference voltage. The method further sets forth generating a reference current that corresponds to the second reference voltage and sourcing the reference current to an amplifier. The method also calls for amplifying a data signal with the amplifier to drive the external termination pad and generating a current control signal by comparing a voltage at the external termination pad to the second reference voltage. Finally, the method recites sourcing an on-die termination current to the external termination pad that corresponds to the current control signal.

An embodiment of a bus system, according to the present invention, includes at least one bus line, a termination voltage terminal coupled to the bus line and configured to have an external termination voltage, and a termination resistor coupled between the termination voltage terminal and the bus line and having an external resistance value. The bus system also includes a bus interface device having an external termination pad coupled to the bus line. The bus interface device is configured to receive the termination voltage and an external reference voltage and compare the termination voltage and an external reference voltage in order to generate an output low reference voltage. The device is further configured to compare the output low reference voltage to a voltage at the external termination pad in order to generate a current control signal, where the device includes a current source configured to source current to the external termination pad responsive to the current control signal. In another aspect of this embodiment of the present invention, the bus interface device is further configured to generate a reference current corresponding to the output low reference voltage and the device further includes an amplifier for generating an output signal at the external termination pad responsive to a data signal, where the amplifier operates from the reference current such that an output swing of the output signal of the amplifier corresponds to the output low reference voltage. In still another aspect of this embodiment of the present invention, the bus interface device is further configured to generate the current control signal by transmitting a predetermined data pattern at the external termination pad, where the predetermined data pattern alternates between high and low logic levels, compare a signal present at the external termination pad to the output low reference voltage in order to obtain a received data pattern that corresponds to the transmitted predetermined data pattern, and compare the received data pattern to the predetermined data pattern in order to adjust the current control signal.

The foregoing and other features and advantages of the circuit and method for interfacing with a bus line will be apparent from the following more particular description of exemplary embodiments of the present invention as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein.

DETAILED DESCRIPTION OF PREFERRED EMBODIMENTS

The present invention is directed to a circuit, system and method for adaptive on-die termination (ODT) that can adapt to a termination resistance present on a bus channel. The ODT system and method according to the present invention automatically adjusts to the termination resistance of the bus channel using a feedback loop to detect the average output voltage level at a termination pad coupled to the bus channel through a transmit cycle. Further, the present invention provides a constant output voltage swing by providing a reference current to the output driver.

The present invention makes use of the tracking differences between the terminating voltage $V_{TERM}$ and the reference voltage $V_{REF}$ to derive an output low reference voltage $V_{OLREF}$ for comparison with an output voltage generated by an output driver at an on-die termination pad during a current control sampling cycle. $V_{TERM}$ and $V_{REF}$ are normally derived from a single voltage regulator and then buffered to the various components of a bus system to set a logic threshold reference and a voltage supply for the input receiver circuits coupled to the bus. The present invention exploits the fact that $V_{TERM}$ and $V_{REF}$ track one another with respect to a supply voltage $V_{DD}$ and set the reference midpoint of the data receiver and the common mode range of the input signal. The present invention uses the relationship between $V_{TERM}$ and $V_{REF}$ to determine the common mode range and swing of the signal received by the input receiver to determine the output swing of an output driver so that the swing of the output signal matches and tracks the dynamic range of the input signal.

In the present invention, the output low reference voltage $V_{OLREF}$ is derived from $V_{TERM}$ and $V_{REF}$, such as by multiplying the difference between $V_{TERM}$ and $V_{REF}$ by (−1) with respect to $V_{REF}$. $V_{OLREF}$ is then compared to the output voltage $V_{OL}$ observed at the on-die termination pad. By using polysilicon resistors formed with the components of an operational amplifier to generate $V_{OLREF}$, a high degree of accuracy in the reference voltage may be obtained. Further, asymmetry bits may be utilized in the present invention to increase the range of signal swing in the output signal $V_{OL}$. Further, the present invention may operate by deriving $V_{OLREF}$ using either $V_{TERM}$ or an output high voltage level $V_{OH}$ obtained from the an on-die termination pad.

Figure 1:
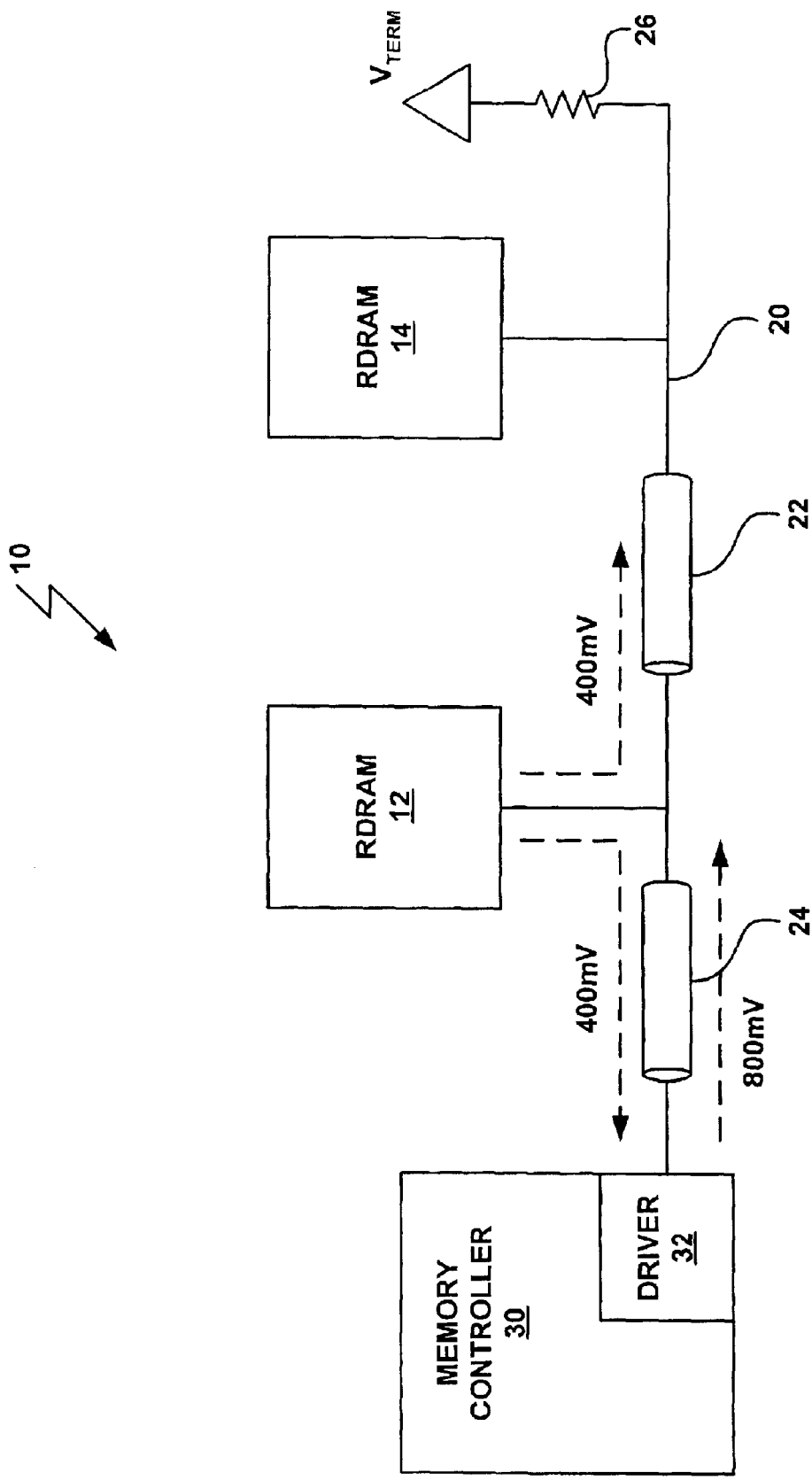
FIG. 1 is a functional block diagram illustrating an example of a conventional bus system.
Figure 6:
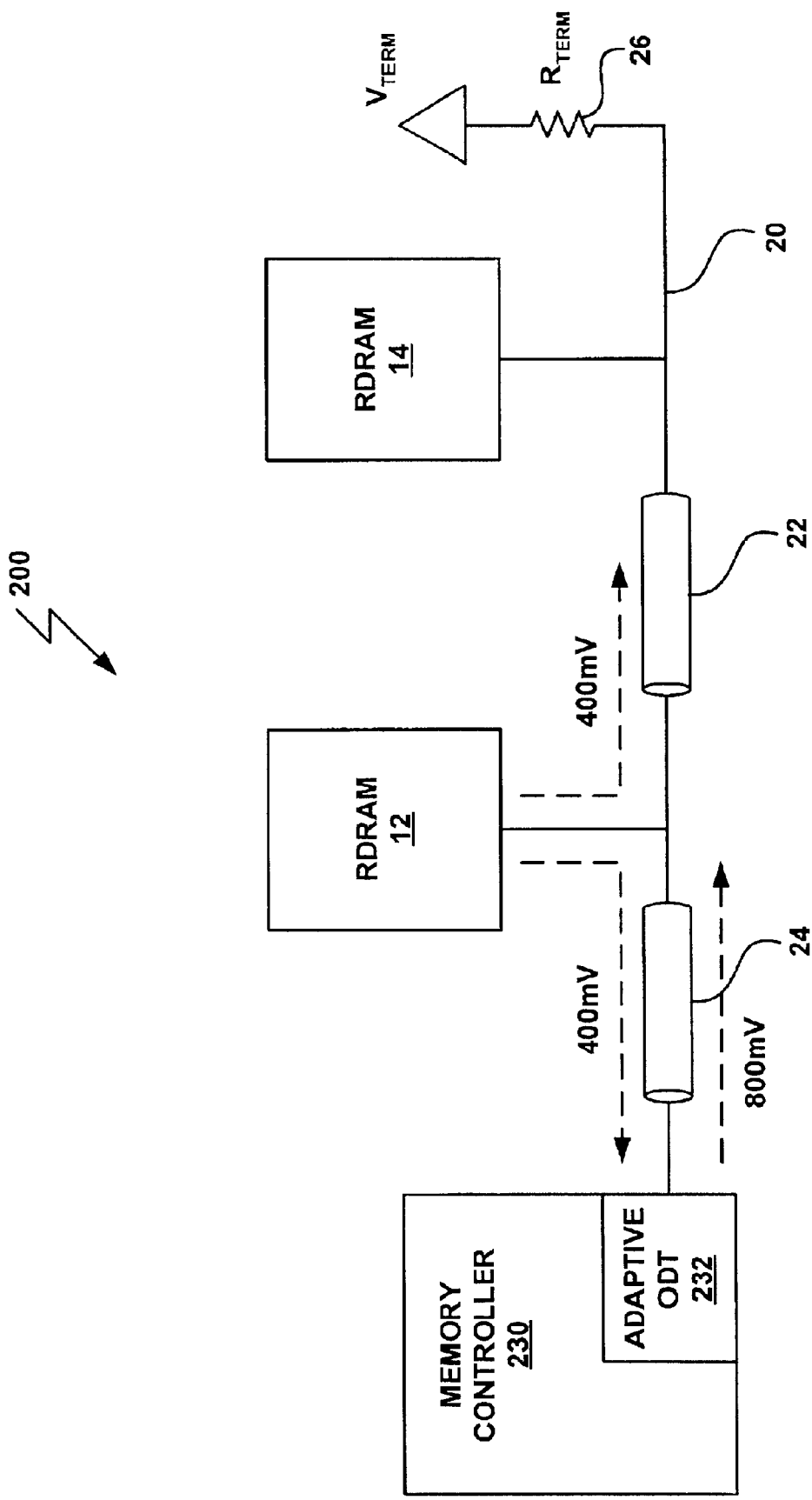
FIG. 6 is a functional block diagram illustrating a bus system involving an interface circuit according to one embodiment of the present invention.

FIG. 6 is a functional block diagram illustrating an embodiment of a memory controller 230 having an adaptive ODT 32 according to the present invention. Memory controller 32 is coupled to bus 20 via adaptive ODT 32. As in the system of FIG. 1, memory controller 30 transfers data to and from RDRAM devices 12 and 14 via bus 20. Further, bus 20 is terminated to terminating voltage $V_{TERM}$ via terminating resistor 26.

Figure 7:
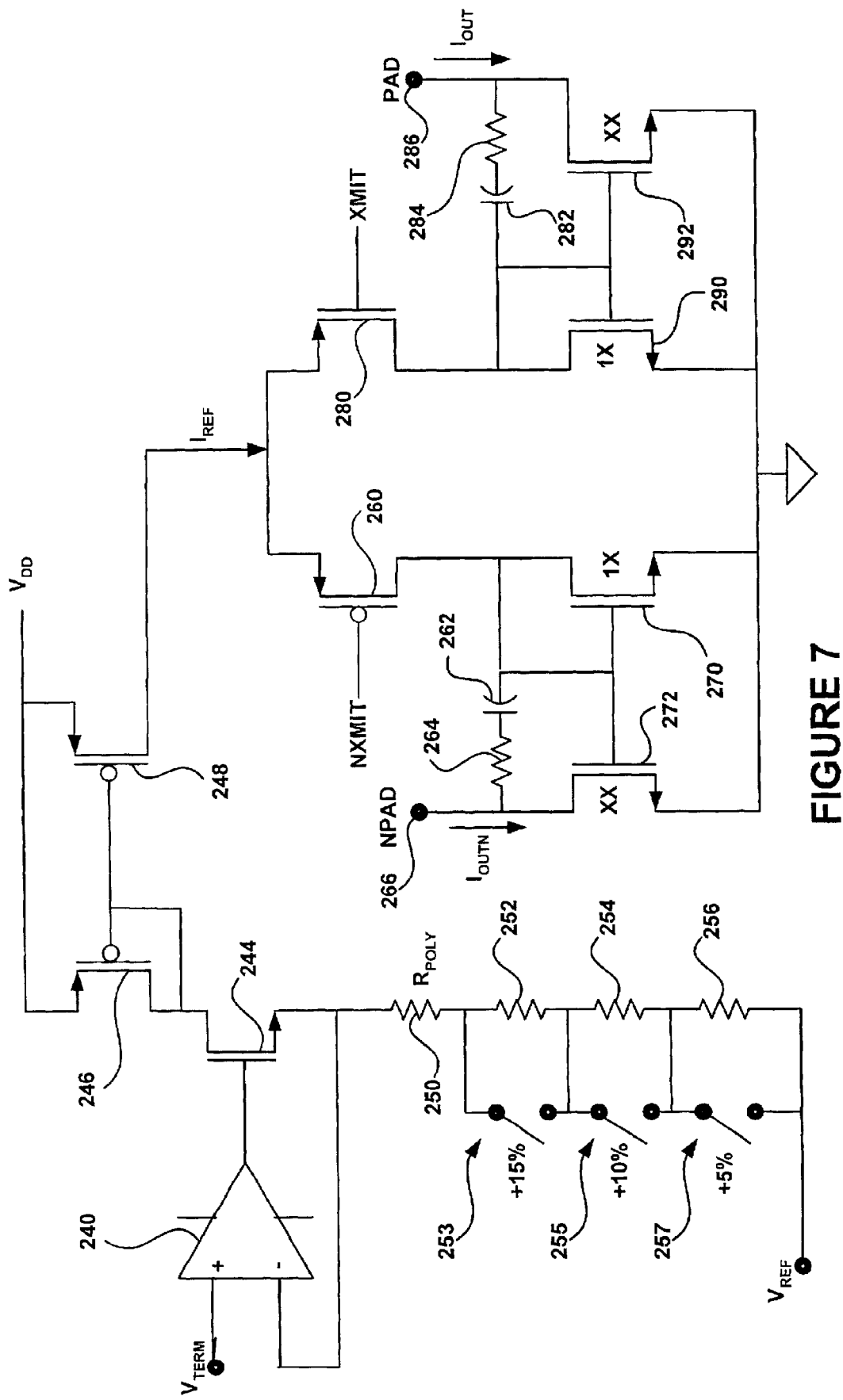
FIG. 7 is a functional block diagram illustrating a circuit for producing a reference current and an output amplifier according to one embodiment of the interface circuit shown in FIG. 6.

FIG. 7 is a functional block diagram illustrating an embodiment of a circuit, according to one aspect of the present invention, for generating a reference current $I_{REF}$ for producing a constant swing output voltage. A comparator 240 receives terminating voltage $V_{TERM}$ at one terminal and a scaled reference voltage obtained from $V_{REF}$ through poly-silicon resistor 250, and a selectable resistance circuit composed of trimming resistors 252, 254, and 256, along with trimming switches 253, 255, and 257. Switches 253, 255, and 257 can be selectively closed and opened to adjust the output current or lower the output voltage level $V_{OL}$.

Comparator 240 compares the terminating voltage $V_{TERM}$ to the scaled reference voltage to generate a difference signal that drives a gate or control terminal of transistor 244. The drain of transistor 244, which is a current conducting terminal, feeds back to comparator 240 such that the current through transistor 244 drives terminating voltage $V_{TERM}$ at one terminal and a scaled reference voltage obtained from $V_{REF}$ through poly-silicon resistor 250, trimming resistors 252, 254, and 256, along with trimming switches 253, 255, and 257 to produce a feedback voltage signal at the negative input terminal of comparator 240. The current through transistor 244 is mirrored through transistors 246 and 248 to produce reference current $I_{REF}$.

In this embodiment, the value of $I_{REF}$, is obtained from $(V_{TERM}-V_{REF})/(R_{POLY}+R_{ADJUST})$, where $R_{POLY}$ is the value of the polysilicon resistor 250 and $R_{ADJUST}$ is the value provided by trimming resistors 252, 254, and 256, along with trimming switches 253, 255, and 257. Trimming resistors 252, 254, and 256 are included to provide asymmetry adjustment, e.g. increase the output swing, and trimming switches 253, 255, and 257 are activated accordingly to set the asymmetry level. An operational amplifier may be used to drive the trimming switches.

Reference current $I_{REF}$ provides the current source for a differential amplifier having, as its differential inputs, the gates of PMOS transistors 260 and 280. PMOS transistor 260 is coupled in series with NMOS transistor 270, which is a unit size transistor, e.g. 1X. The gate of transistor 270 is coupled to the gate of NMOS transistor 272, which is a much larger scale transistor that scales up the current through transistor 270 to drive inverted output current $I_{OUTN}$ at inverted output NPAD 266. As understood in the art, the size of a transistor is generally considered to be the ratio of the width to the length of the transistor channel. Capacitor 262 and resistor 264 are coupled between the gate and drain of transistor 272 and may be selected to control a slew rate of the output driver transistor 272. Likewise, PMOS transistor 280 is coupled in series with NMOS transistor 290. The gate of transistor 290 is coupled to the gate of NMOS transistor 292 to scale up the current through transistor 290 by a factor of X to drive output current $I_{OUT}$ at non-inverted output PAD 286. Capacitor 282 and resistor 284 are coupled in series between the gate and drain of transistor 292 and may be selected to control a slew rate of the output driver transistor 292. Also, controlling the reference current $I_{REF}$ may also contribute to control of the output driver slew rate.

A complementary pair of data input signals XMIT and NXMIT drive the gates of transistor 260 and 280 to modulate the portion of reference current $I_{REF}$ that reaches transistors 270 and 290, respectively. The modulated current through transistor 270 is scaled up by transistor 272, e.g. scaled by the proportion of the size of transistor 272 to the size of transistor 270, in order to obtain an inverted output current signal $I_{OUTN}$ at the inverted output pad 266. Likewise, the modulated current through transistor 290 is scaled up by transistor 292, e.g. scaled by the proportion of the size of transistor 292 to the size of transistor 290, in order to obtain an output current signal $I_{OUT}$ at the output pad 286. As a result, the output current signals $I_{OUT}$ and $I_{OUTN}$ have a constant output current swing centered on $I_{REF}$. One of ordinary skill in the art will readily recognize that $I_{REF}$ may also be used to source current to a single input amplifier.

The reference current $I_{REF}$ may be obtained from the formula $(V_{TERM}-V_{REF})/(R_{POLY}+\text{Radjustment})$, where $R_{POLY}$ is the resistance of polysilicon resistor 250 and Radjustment is the selected adjustment resistance introduced by the selectable resistance circuit composed of resistors 252, 254 and 256 in combination with switches 253, 255 and 257. For example, if the desired magnitude of $I_{OUT}$ is 28 mA (milli-Amperes) and the size ratio X between transistor 292 to transistor 290 is 20, then the reference current $I_{REF}$=28 mA/20=1.4 mA. Using $V_{TERM}$=1.8V, $V_{REF}$=1.4V, and assuming no Radjustment is necessary, then $R_{POLY}$=(1.8V−1.4V)/1.4 mA=285Ω. Switches 253, 255 and 257 may, for example, be controlled by an operational amplifier to adjust the reference current $I_{REF}$ by 5%, 10% or 15%, respectively, and are adjusted to account for asymmetry.

The circuit of FIG. 7 makes use of the tracking differences between $V_{TERM}$ and $V_{REF}$ to derive the reference current $I_{REF}$. $V_{TERM}$ and $V_{REF}$ are typically derived from a voltage regulator circuit provided, for example, by a mother board and buffered to form the reference supply voltage levels for the memory controller, RDRAM, or other devices operating on bus 20 of FIG. 6. As a result, $V_{TERM}$ and $V_{REF}$ track one another with respect to a voltage supply level $V_{DD}$ and are typically used to set the reference midpoint for the receiver circuits used to receive signals on bus 20. The present invention uses $V_{TERM}$ and $V_{REF}$ to determine the output swing for the transmitter circuits used to transmit data onto bus 20 so that the input and output circuitry tracks one another.

Figure 8:
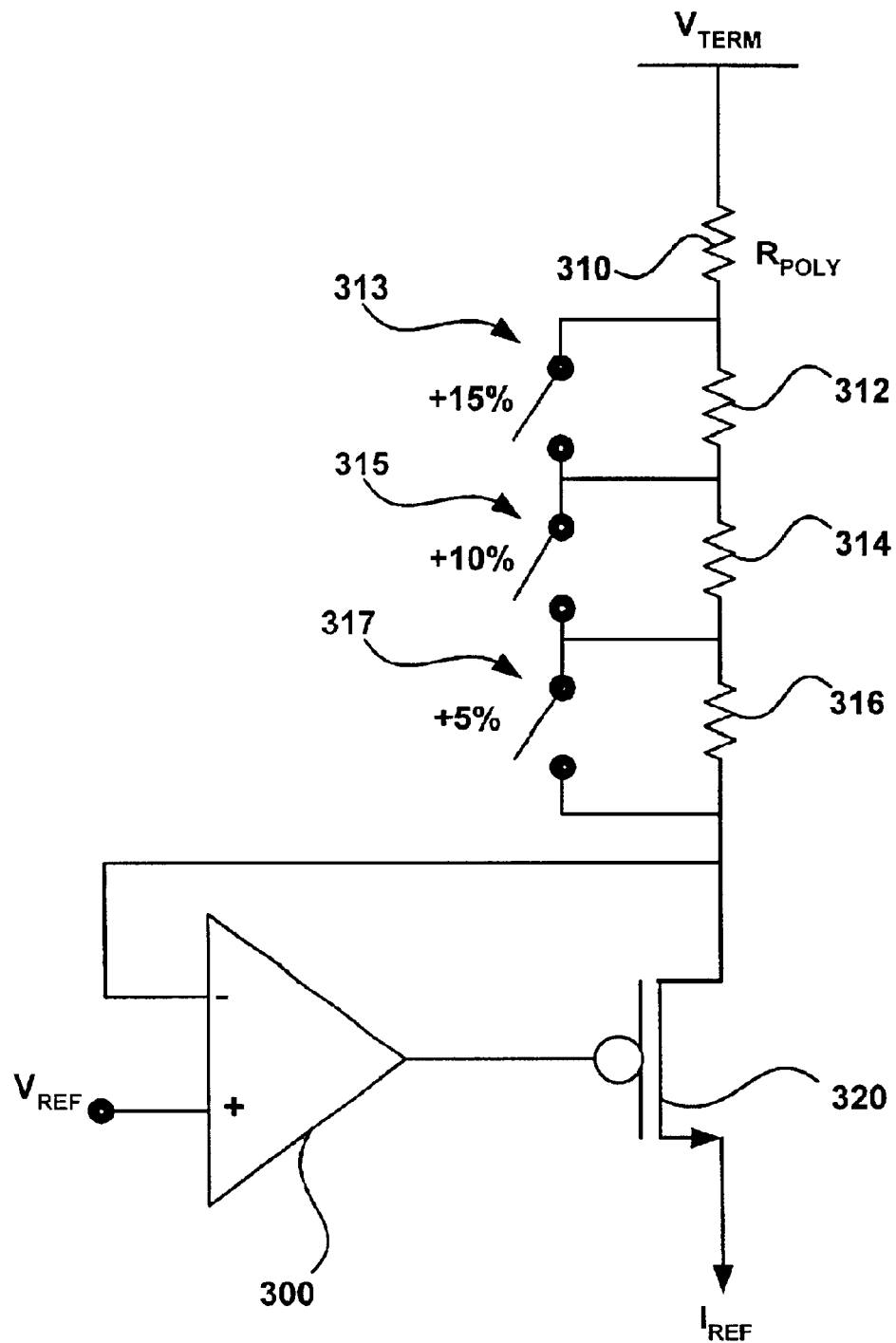
FIG. 8 is a functional block diagram illustrating another embodiment of a circuit for producing a reference current according to the present invention.

Note that the reference current may be obtained using other circuits, such as the circuit illustrated in FIG. 8, wherein $V_{REF}$ is input to one input of comparator 300 and the $V_{TERM}$ is adjusted by resistor 310 and trimming resistors 312, 314 and 316 in combination with switches 313, 315, and 317. The output of comparator 300 drives the gate of PMOS transistor 320 in order to generate the reference current $I_{REF}$. Note that switches 313, 315, and 317 may be implemented using pass gates to perform offset control. See FIG. 16 for an example. One of ordinary skill in the art will readily appreciate that a variety of approaches may be effective for deriving the reference current $I_{REF}$ using $V_{TERM}$ and $V_{REF}$ in accordance with the teachings of the present invention.

Figure 9:
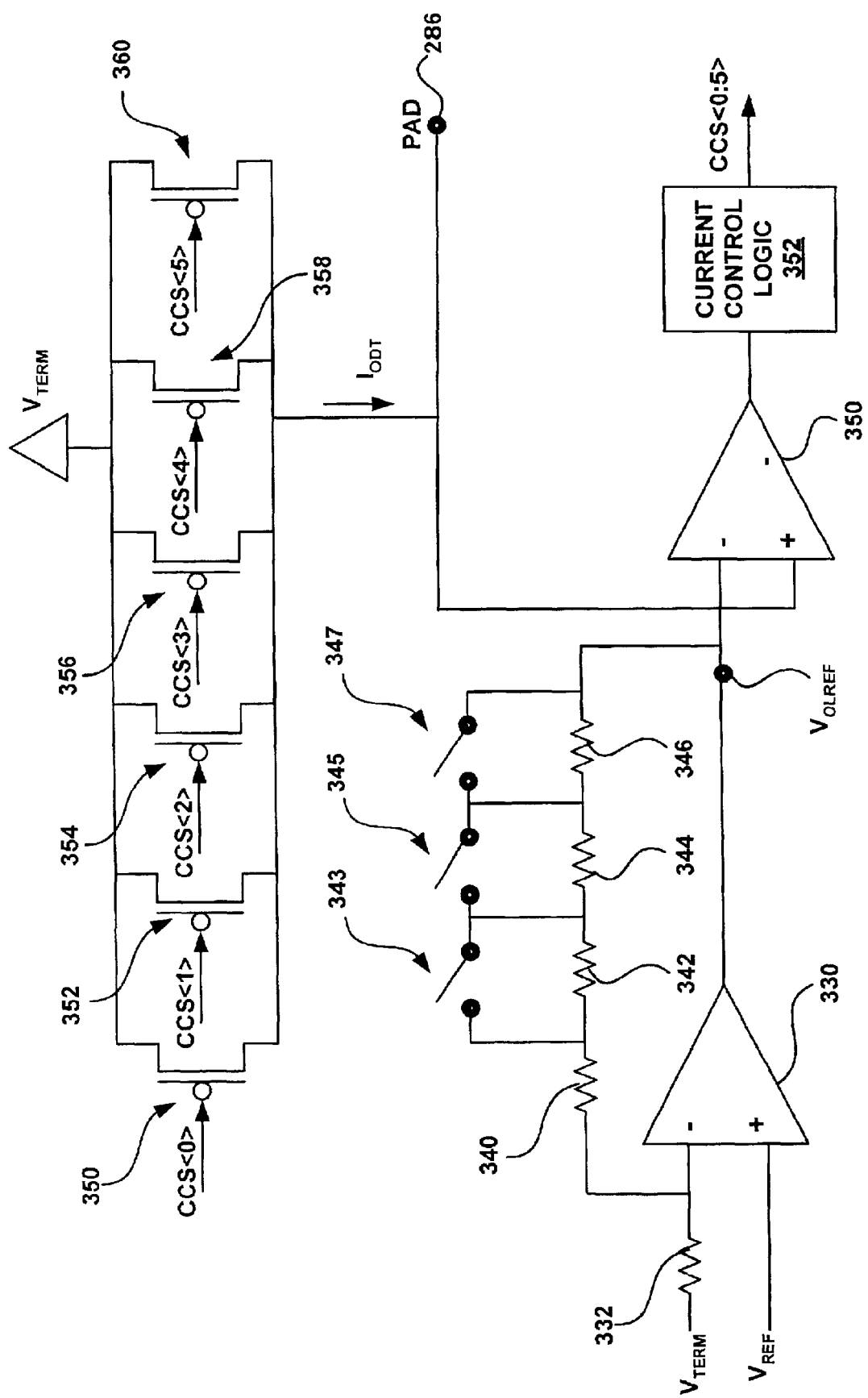
FIG. 9 is a functional block diagram illustrating a circuit for producing an output low reference voltage and generating a digital current control signal according to one embodiment of the interface circuit shown in FIG. 6.

FIG. 9 is a functional block diagram illustrating a circuit for providing an adaptive impedance, according to another aspect of the present invention, to adapt to an external impedance coupled to pad 286, e.g. an on-die termination (ODT). In FIG. 9, amplifier 330 multiplies the difference between $V_{REF}$ and an adjusted $V_{TERM}$ in order to obtain a output logic high reference voltage $V_{OLREF}$ of approximately 1V, e.g. the RAMBUS low output voltage level. Amplifier 330 also amplifies the result of the comparison by, for example, a factor of (−1) with respect to $V_{REF}$ in order to generate $V_{OLREF}$. Resistor 340 along with resistors 342, 344 and 346 in combination with switches 343, 345 and 347 are used to adjust $V_{OLREF}$ for asymmetry in a like manner to the adjustments to $I_{REF}$ made to account for asymmetry. For example, switches 343, 345 and 347 may be selectively activated and the values of resistors 342, 344 and 346 chosen to allow $V_{OLREF}$ to be adjusted to 0.95V, 0.9V, or 0.85V, e.g. −5%, −10% or −15%. The same circuitry used to drive the switches of FIGS. 7 and 8 may be employed to drive the switches of FIG. 9.

Figure 2:
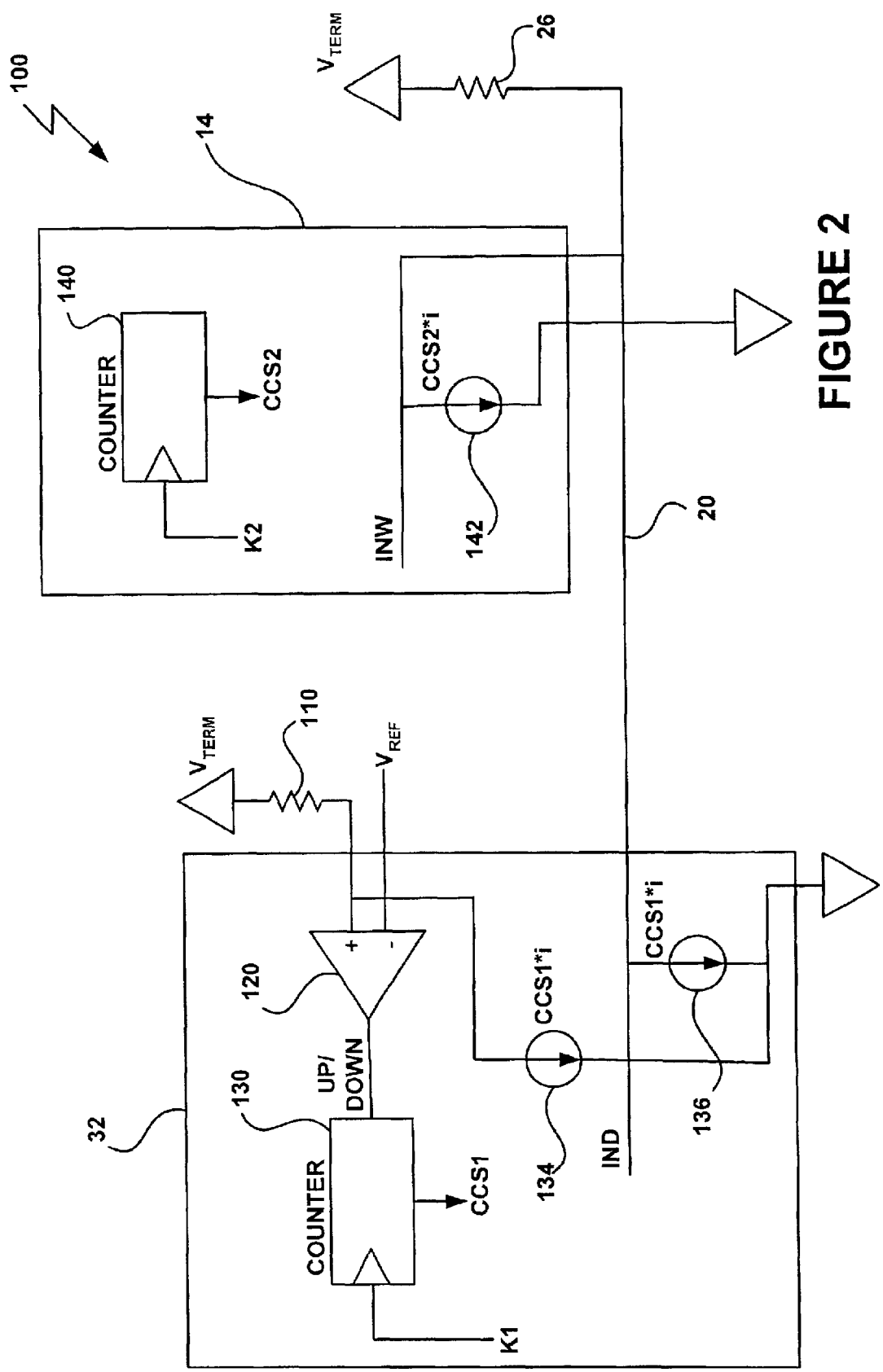
FIG. 2 is a functional block diagram illustrating an example of a conventional current control circuit used to interface with the bus system of FIG. 1.
Figure 3:
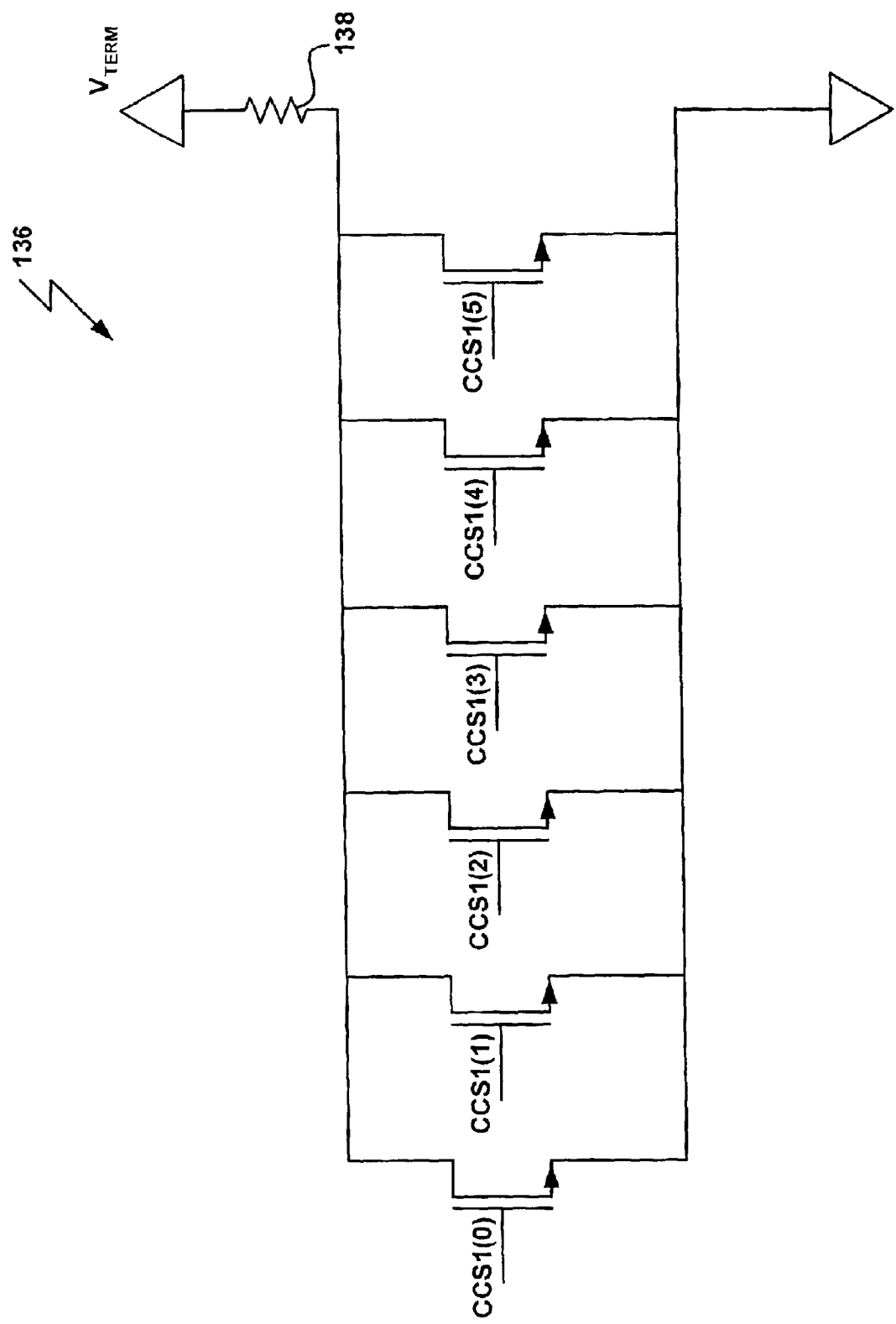
FIG. 3 is a functional block diagram illustrating an example of a conventional variable current source circuit suitable for use in the interface circuits of FIG. 2.

In FIG. 9, when, for example, a 28Ω external termination resistor, such as resistor 26 in FIG. 6, is coupled between termination voltage $V_{TERM}$ and on-die termination pad 286, then an output voltage signal $V_{OL}$ is generated at the termination pad 286, by turning on the output devices shown, for example, in FIG. 3, which is generated when current source 134 of FIG. 2 draws current. $V_{OL}$ is fed back and compared to $V_{OLREF}$ in a closed feedback loop that fine tunes the internal current source that generates current $I_{ODT}$ and the output swing of the data output signal at pad 286 will be between $V_{TERM}$ and $V_{OLREF}$. In this case, $I_{REF}$ provides a highly accurate current reference because it is created using polysilicon resistors, e.g. resistor 250 in FIG. 7, and by tracking the difference between $V_{TERM}$ and $V_{REF}$, which are largely independent of most variables on the chip upon which the circuit is fabricated. Error may be introduced when the output current is mirrored, but the closed loop adjustment will control the output voltage signal swing at pad 286 such that it remains twice the difference between $V_{TERM}$ and $V_{REF}$.

Further, in the present invention, when a 56Ω external resistor is coupled between termination voltage $V_{TERM}$ and on-die termination pad 286, then the circuit of FIG. 9 will replicate the same impedance at the ODT pad 286. As a result, the circuit functions to provide an internal 56Ω resistance in parallel with the 56Ω external resistor to produce an effective resistance of 28Ω. This permits the output swing of output voltage signal $V_{OL}$ to be maintained at twice the difference between $V_{TERM}$ and $V_{REF}$, despite the difference in value of the external resistor coupled to on-die termination pad 286.

Figure 4:
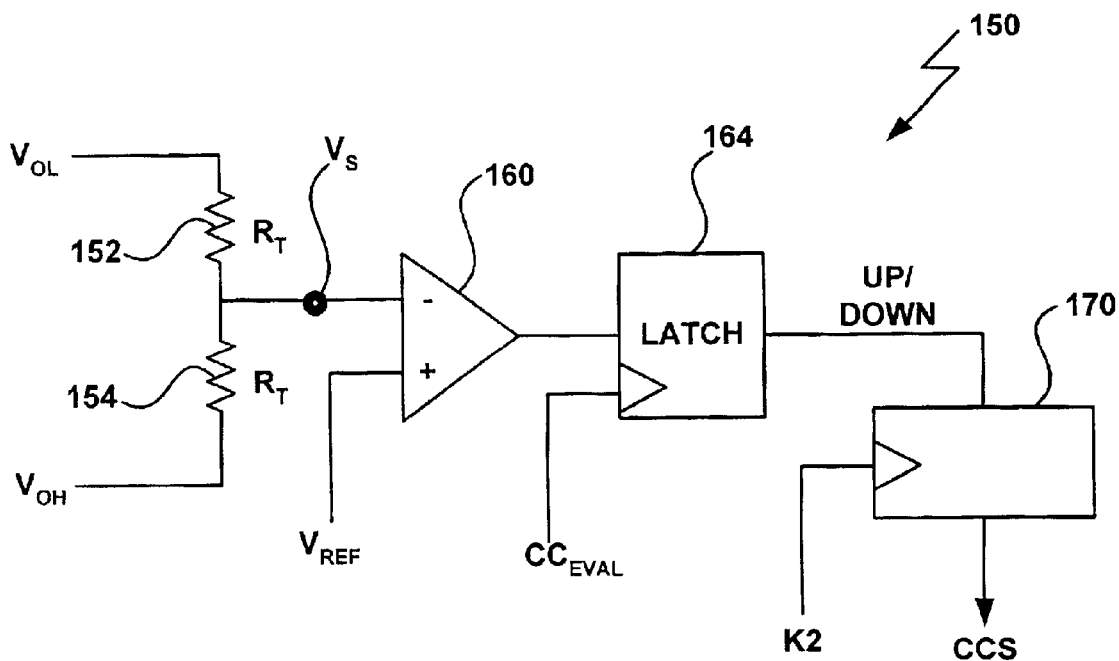
FIG. 4 is a functional block diagram illustrating another example of a conventional current control circuit used to interface with the bus system of FIG. 1.

To accomplish this in the embodiment of FIG. 9, $V_{OLREF}$ is input to an inverting input of comparator 350, which compares the voltage at pad 286 to the reference $V_{OLREF}$ and drive current control logic 352 in order generate a six bit current control signal CCS<0:5>, for example. Note that current control logic 352 includes a storage element similar to latch 164 of FIG. 4 that latches the current control signal value under control of a timing signal, such as $CC_{EVAL}$ of FIG. 4. The current control signal CCS<0:5>, in turn, drives PMOS transistors 350, 352, 354, 356, 358 and 360 to source current $I_{ODT}$ to pad 286, which also feeds back to a non-inverting input to comparator 350 to provide feedback. Thus, if the voltage level at pad 286 does not match reference voltage $V_{OLREF}$, then comparator 350 and current control logic 352 will adjust the current control signal CCS<0:5>to bring the voltage level at pad 286 back into line with the $V_{OLREF}$ reference. Examples of circuitry that may be adapted to function as the current control logic 352 are counters 130 and 140 shown in FIG. 1 and latch 164 and counter 170 of FIG. 4. Comparator 350 may include a capacitor such that the comparator functions as an integrating and averaging comparator, where the comparator is driven by a transmit clock or sample strobe so that the output voltage low observed at the output pad 286 can be integrated and averaged out through a single 'on' cycle.

As noted above, in FIG. 9, $V_{OLREF}$ is obtained by multiplying the difference between $V_{TERM}$ and $V_{REF}$ by (−1) with respect to $V_{REF}$. The resulting $V_{OLREF}$, which will be approximately 1V, may then be compared to a low output voltage $V_{OL}$ observed at output pad 286 at a point in time determined by a control timing signal, such as $CC_{EVAL}$ that drives a latch or storage element of current control logic 352. The gain produced by amplifier 330 is controlled by resistor 340 along with offset resistors 342, 344 and 346. Polysilicon resistors may be used in the present invention, because they are not in the path of the output signal and are highly accurate. Consequently, lower resistors values may be used without attenuating the output signal. Also, note that $V_{OLREF}$ and $V_{OL}$ are compared on a one-to-one basis, which eliminates the need for a divide down network, composed of additional elements, to scale one voltage level for comparison to the other.

Figure 10:
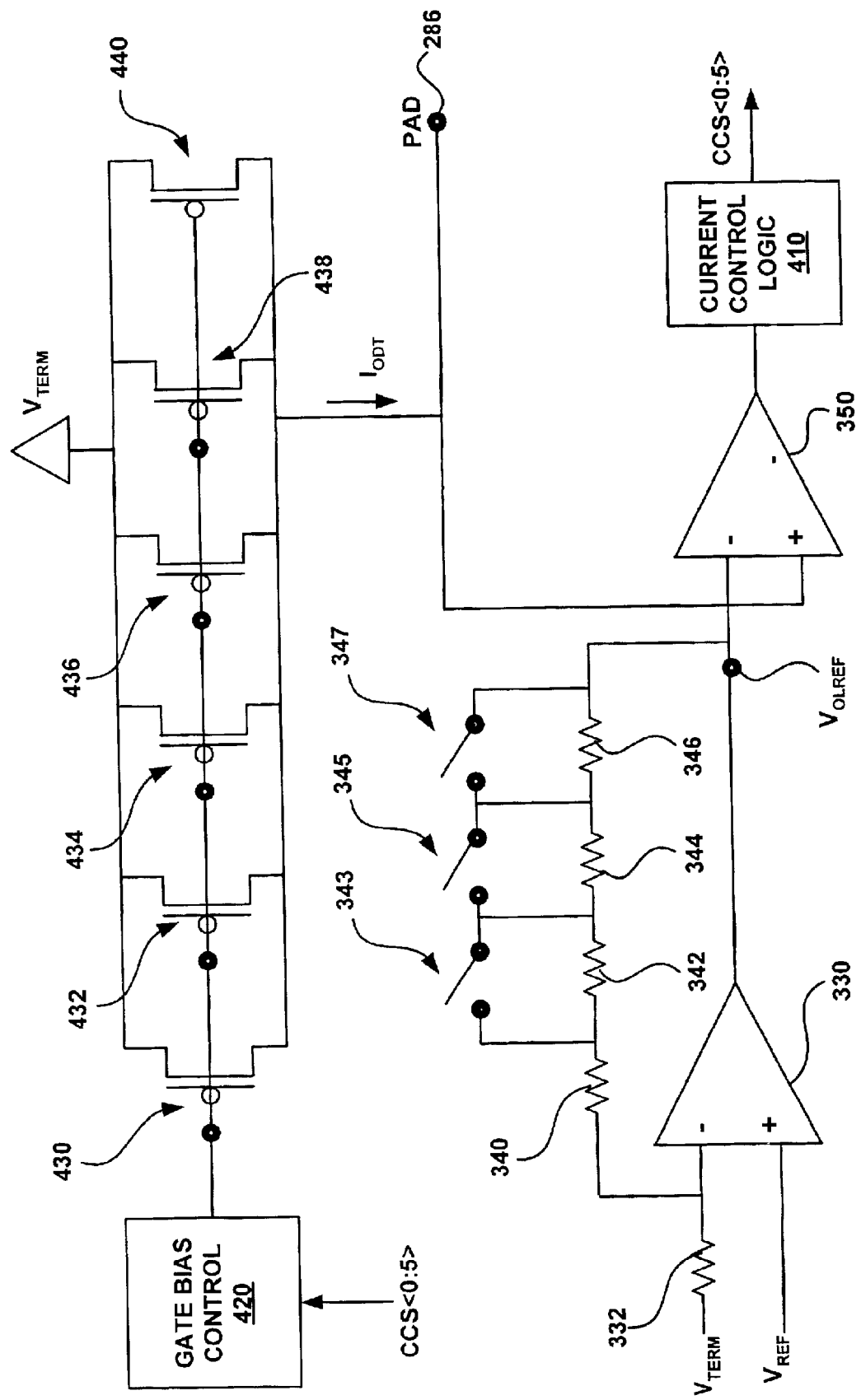
FIG. 10 is a functional block diagram illustrating another circuit for producing an output low reference voltage and generating an analog current control signal according to one embodiment of the interface circuit shown in FIG. 6.

Also note that current $I_{ODT}$ may also be controlled in an analog manner. FIG. 10 illustrates an embodiment of the present invention that employs analog control of $I_{ODT}$. In FIG. 10, current control logic 410 and gate bias control circuit 420 are adapted to operate PMOS transistors 430, 432, 434, 436, 438 and 440 in their linear range. Gate bias control circuit 420 may, for example, include a digital to analog converter that converts current control signal CCS<0:5> into an analog bias control signal that drives the gates of the PMOS transistors. The result is similar to the circuit of FIG. 9 in that a feedback control loop is formed that controls the current supplied to pad 286. However, the PMOS current source devices generating $I_{ODT}$ at the on-die termination pad 286 can be better regulated using an analog signal because the devices stay in a linear operating region and the output impedance variation is reduced. The embodiment of FIG. 10 also illustrates how the concepts of the present invention may be applied using a variety of approaches.

Figure 11:
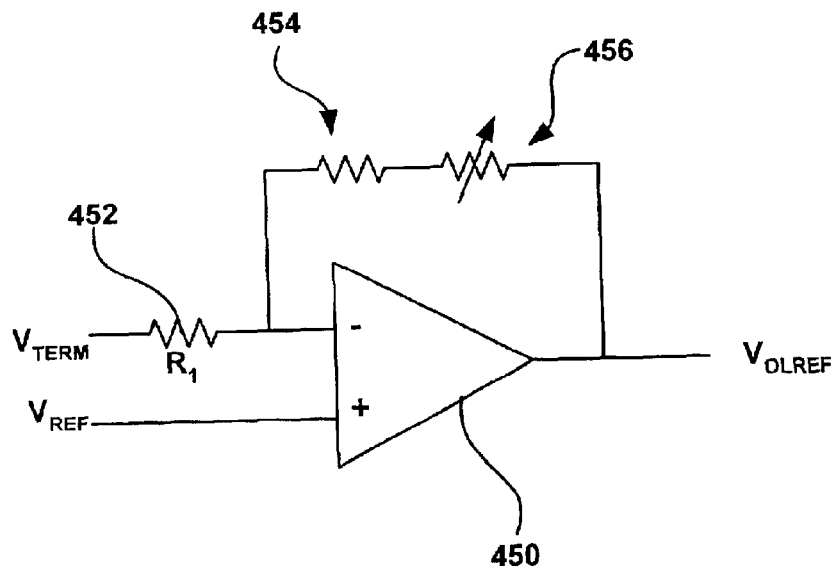
FIG. 11 is a functional block diagram illustrating a simplified circuit for producing an output low reference voltage according to the present invention using a terminating voltage and a reference voltage.

FIG. 11 is a functional block diagram illustrating a simplified circuit for generating the reference voltage $V_{OLREF}$. In FIG. 11, an output of operational amplifier 450 is coupled to a negative or inverting input of amplifier 450 via polysilicon resistor 454 and adjustable resistance 456. (Adjustable resistance 456 may be obtained using a variety of approaches, including the use of trimming resistors and switches demonstrated in FIGS. 9 and 10 above.) $V_{TERM}$ is also coupled to the negative input of amplifier 450 through polysilicon resistor 452. The value of resistors 452 and 454 is designed to be approximately the same value. Because resistors 452 and 454 are formed in polysilicon, their values may be carefully controlled through the use of well known fabrication techniques. The high accuracy of the polysilicon resistors allows the gain of the amplifier circuit formed using amplifier 450 to be very close to unity. $V_{REF}$ is input to a positive or non-inverting input of amplifier 450 such that $V_{TERM}$ and $V_{REF}$ are compared in order to obtain $V_{OLREF}$. The output swing of the overall circuit may be increased by increasing the value of adjustable resistance 456 in order to increase the feedback gain of the amplifier to greater than unity.

Figure 12:
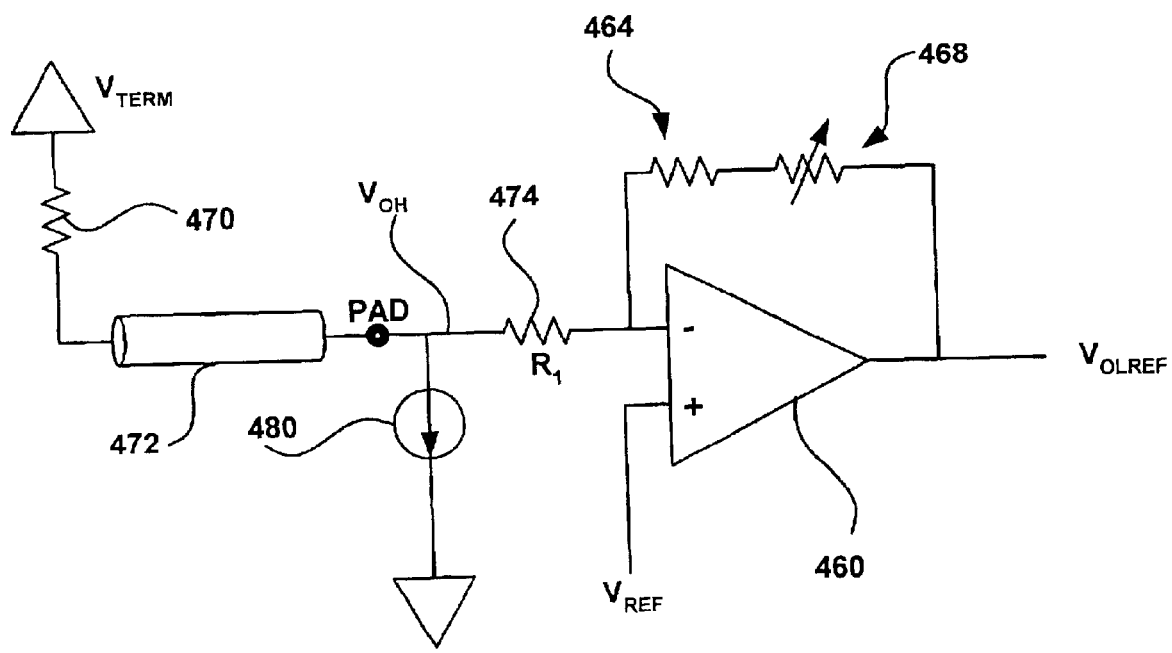
FIG. 12 is a functional block diagram illustrating another simplified circuit for producing an output low reference voltage according to the present invention using a terminating voltage and an output high voltage.

Note that $V_{OLREF}$ may also be obtained from an output high voltage level $V_{OH}$, as demonstrated in FIG. 12. In FIG. 12, an output of amplifier 460 is coupled to a negative or inverting input of amplifier 460 via polysilicon resistor 464 and adjustable resistance 468. Also, $V_{REF}$ is input to a positive or non-inverting input of amplifier 460. However, current source 480 is turned off such that the transistor draws no current from $V_{TERM}$ through terminating resistor 470 and transmission line 472. This combination produces the output high voltage level $V_{OH}$ at the pad 286. In FIG. 12, adjustable resistance 468 may be adjusted to offset the resistance of resistor 474.

Figure 13:
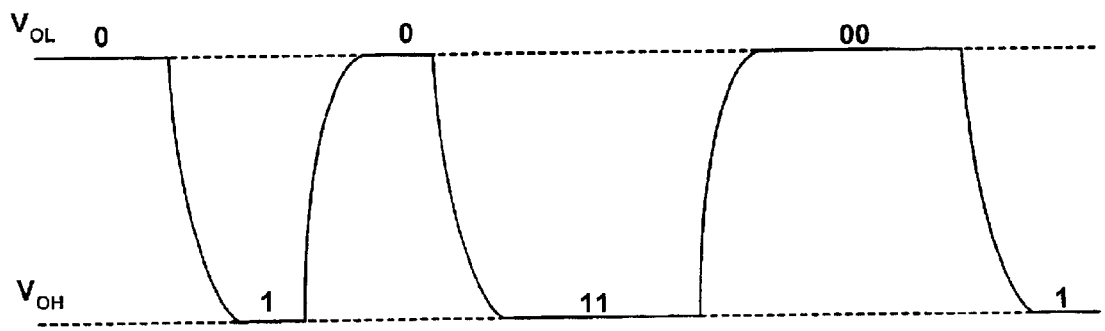
FIG. 13 is a waveform diagram illustrating an example of the voltage levels and signal waveforms corresponding to a preset pattern that may be result at the interface with the bus system of FIG. 6.
Figure 14:
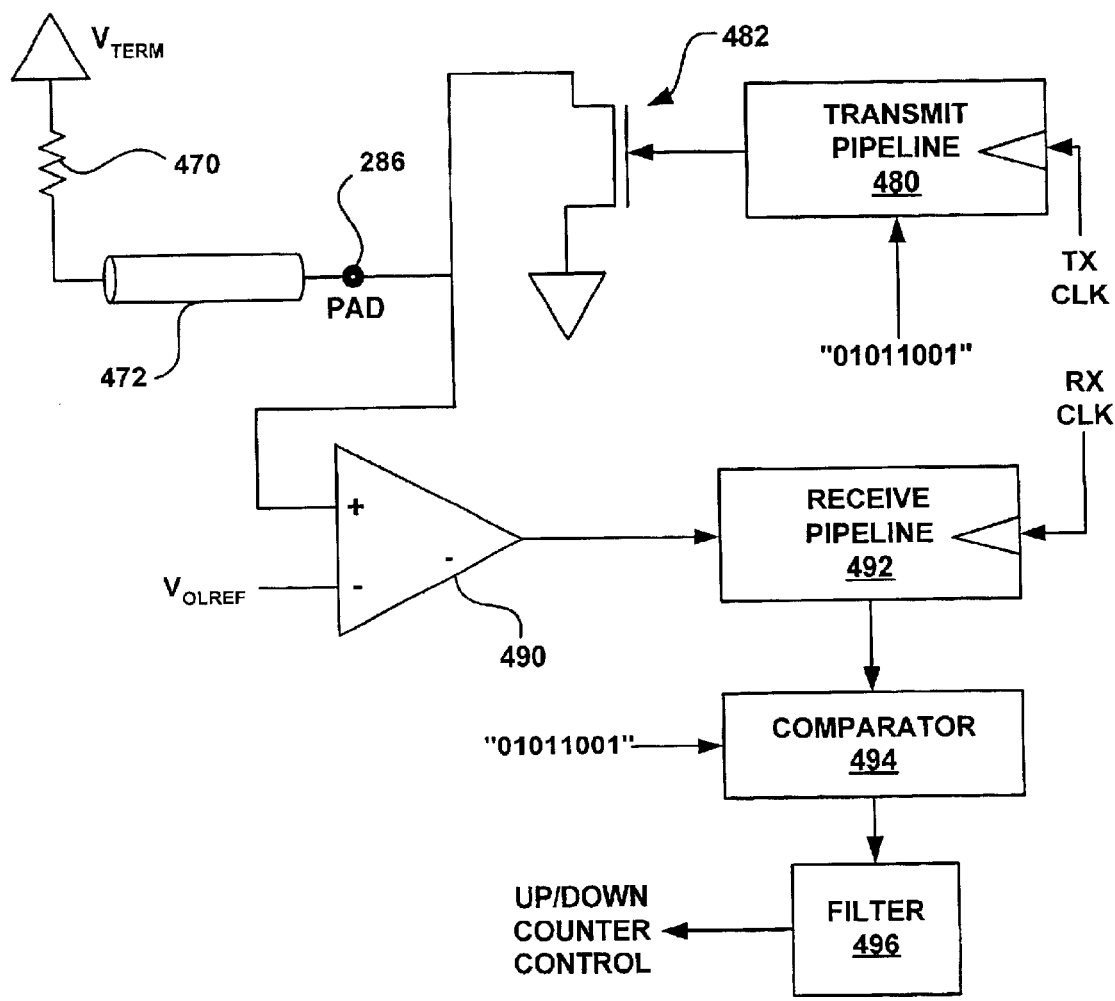
FIG. 14 is a functional block diagram illustrating another embodiment of a circuit for producing a current control signal by transmitting and observing the preset data pattern of FIG. 13 according to one embodiment of the interface circuit shown in FIG. 6.

Yet another embodiment of the present invention adapts to alternating current (AC) characteristics observed at an ODT. To observe AC characteristics, a preset pattern containing both logical 1s and logical 0s is transmitted at a data input/output termination. FIG. 13 is a waveform diagram illustrating an example of an alternating pattern useful for observing AC characteristics that corresponds to transmitted data word of '01011001'. FIG. 14 is a functional block diagram of an embodiment of a circuit, according to present invention, for observing a preset alternating data pattern and adjusting a current control signal.

In FIG. 14, input/output termination pad 286 is coupled to $V_{TERM}$ via transmission line 472 and external terminating resistor 470. NMOS transistor 482 is coupled between pad 286 and a ground voltage supply rail and its gate is driven by a transmit pipeline register 480. Transmit pipeline register 480 is loaded with the preset data pattern '01011001' and driven by a transmit clock signal TX CLK to transmit the preset data pattern at pad 286. Also coupled to pad 286 is a positive or non-inverting input of comparator 490. Reference voltage $V_{OLREF}$ is input to a negative or inverting input of comparator 490. Comparator 490 compares the signal at pad 286 to reference voltage V and inputs the difference signal to receive pipeline register 492. Receive pipeline register 492 is driven by receive clock signal RX CLK to store the difference signal observed by comparator 490 such that register 492 stores difference signal coinciding with the transmission of the preset data pattern at pad 286, which should match the preset data pattern transmitted at pad 286. The value stored in register 492 is compared to the preset data pattern by comparator 494 to determine if the received data pattern matches the preset data pattern. The output of the comparator 494 is filtered by filter 496 to generate an UP/DOWN COUNTER CONTROL SIGNAL similar to the up/down control signal shown in FIGS. 2 and 4.

The output of comparator 494 indicates the direction of adjustment for a current control counter. Various logical algorithms may be employed by filter 496 to produce the UP/DOWN COUNTER CONTROL signal. For example, if both the '1' and '11' subpatterns of the preset data pattern are missing, then the current control count should be increased in order to increase the output current $I_{ODT}$ to output pad 286. If the '1' and '11' subpatterns are received, then the counter may be held at its current value or decremented to reduce the current. Another example of a filter suitable for use with the present invention is a uniformity detector, wherein a predetermined number N uniform and consecutive decisions are received before the counter is adjusted, which reduces toggling of the UP/DOWN COUNTER CONTROL signal. Another approach is to hold the counter value at a lock point that signifies metastability in sampling. Various algorithms and approaches to detecting metastability are widely known and well understood to those of ordinary skill in the art and are therefore not elaborated upon herein.

Unlike the direct current (DC) approach discussed above with regard to FIGS. 9 and 10, the AC current control approach of FIG. 14 requires that the transmitted pattern signal be in quadrature to the receive clock RX CLK signal that drives receive pipeline 492 and that the pattern be transmitted and received at normal operating speed in order to obtain an accurate sample. A source synchronous clocked system, such as typically exists in the memory controller devices of FIGS. 1 and 2, can use the approach of FIG. 14 because both the receive and transmit clock signals within the devices are generated from the same source. Consequently, the data transmit and receive clocks automatically have the proper phase relationship. However, a slave device, such as the RDRAMs of FIGS. 1 and 2, there is no fixed relationship between the transmit and receive clocks and, therefore, slave devices cannot receive their own transmitted data and the approach of FIG. 14 may not be implemented in the slave device itself. In the case of a slave device, the slave device transmits the preset pattern and the pattern is received by a memory controller device. The memory controller device compares the sampled preset pattern to $V_{OLREF}$ and compares the result to a stored preset pattern. The resulting UP/DOWN COUNTER CONTROL signal may then be transmitted back to the slave device for it to adjust the offset of its current control signal.

Figure 15:
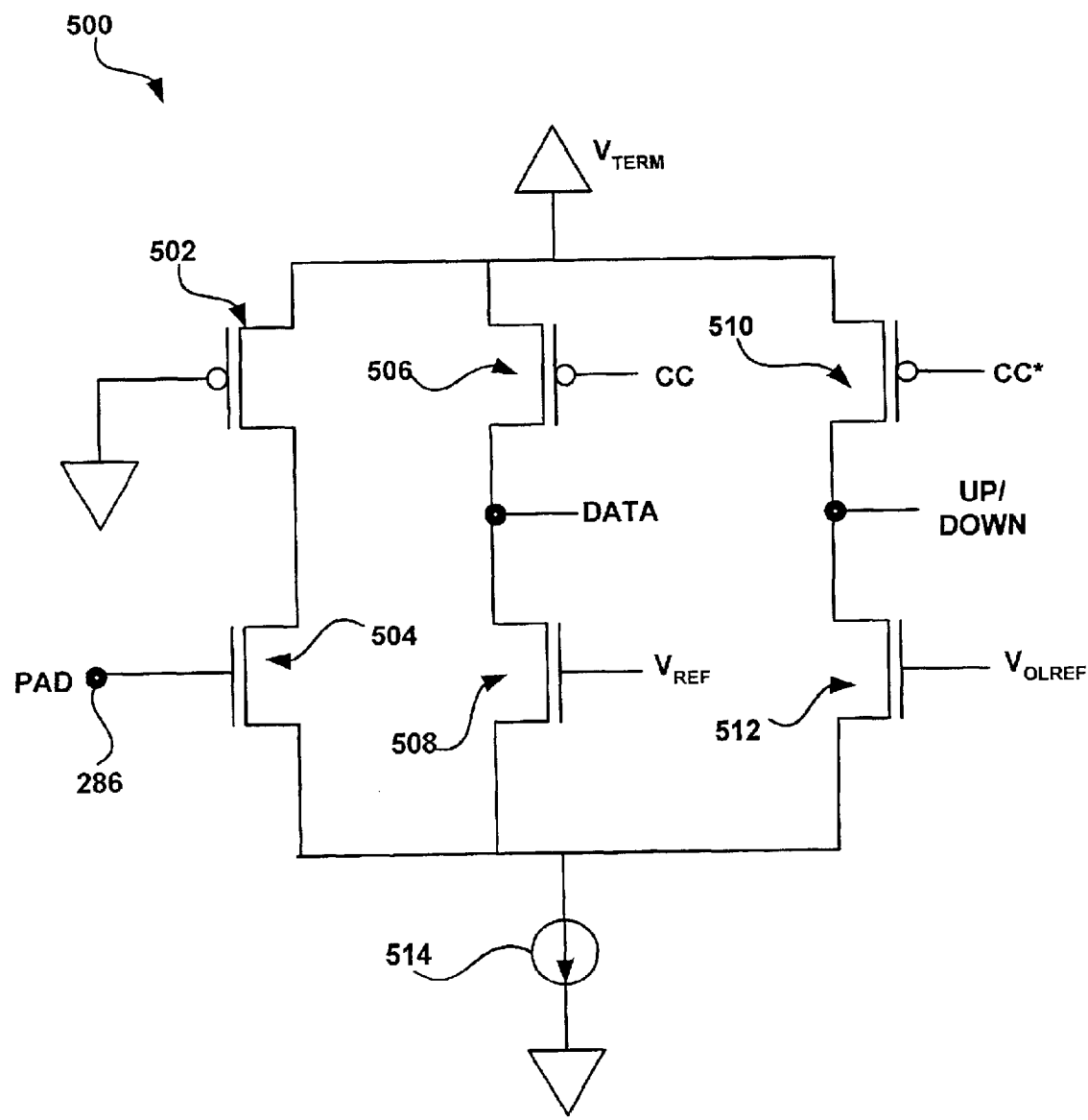
FIG. 15 is a functional block diagram illustrating an embodiment of a dual mode amplifier suitable for use with the circuit of FIG. 14 to reduce the additional circuit elements required to both receive data and sample data for current control at an on-die pad termination.

It should be further noted that, in order to share the input receiver coupled to a pad terminal for both normal operation and for the current control method of the present invention, two modes of operation at the first amplifier stage may be needed. FIG. 15 is a circuit diagram illustrating a dual mode first stage amplifier 500 suitable for use with the present invention. In dual use amplifier 500, PMOS transistor 502 and NMOS transistor 504 are coupled in series between a power supply rail configured to provide $V_{TERM}$, or, alternatively, a supply voltage $V_{DD}$, and current source 514. PMOS transistor 502 has its gate coupled to the ground supply rail and termination pad 286 is coupled to a gate of NMOS transistor 504. PMOS transistor 506 and NMOS transistor 508 are also coupled in series between the power supply rail and current source 514. A gate of PMOS transistor 506 is driven by a current control sampling signal CC, while a gate of NMOS transistor 508 is configured to receive reference voltage $V_{REF}$. Further, PMOS transistor 510 and NMOS transistor 512 are coupled in series between the power supply rail and the ground supply rail, with the gate of PMOS transistor 510 being driven by an inverted current control sampling signal CC* and the gate of NMOS transistor 512 configured to receive the output low reference voltage $V_{OLREF}$ generated as described above. A common drain of transistors 506 and 508 forms a data output node for the dual use amplifier 500, while a common drain of transistors 510 and 512 forms an up/down output node for amplifier 500. Current source 514 sinks current from the sources of transistors 504, 508 and 512, which are current conducting terminals of the transistors, to the ground supply rail.

In amplifier 500, the current control sampling signal CC is low during normal operation, which turns on PMOS transistor 506 and causes the data signal at pad 286 to be compared to $V_{REF}$ by the amplifier formed by transistors 504 and 508 in order to output a received data signal at the data output node. When the current control sampling signal CC is low, then the inverted current control sampling signal CC* is high and PMOS transistor 510 is shut off, which disables NMOS transistor 512 and no signal appears at the up/down output node.

Conversely, when the inverted current control sampling signal CC* is active, e.g. a current control sample is to be made from the termination pad 286, then transistor 506 is shut off and no signal appears at the data output node. At the same time, transistor 510 is turned on so that the data signal to be sampled at pad 286 is compared to $V_{OLREF}$ by the amplifier formed by transistors 504 and 512 to produce an up/down signal at the up/down output node.

Thus, the dual node amplifier 500 amplifies a signal present at an external die termination both for purposes of receiving data during normal operation and sampling data for purposes of adjusting termination current. Dual use amplifier 500 is able to operate in both modes and reduces the number of transistors that might otherwise be required for two separate amplifiers.

Figure 5:
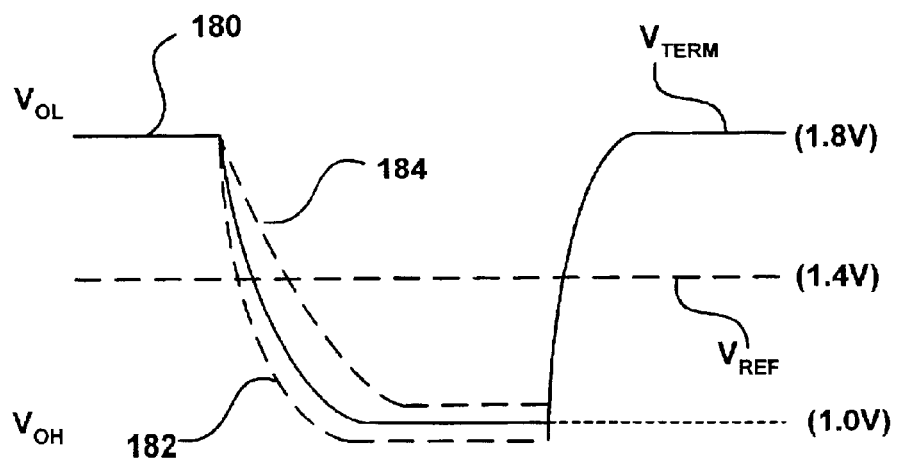
FIG. 5 is a waveform diagram illustrating an example of voltage levels and signal waveforms that may be observed at the interface with the bus system of FIG. 1.

One approach to sampling bus signal voltage levels is through the use of pass gates. This approach is used in FIG. 5 of U.S. Pat. No. 6,094,075 to Garrett, Jr. et al., for example, as generally illustrated in simplified form in the current sample circuit 520 of FIG. 16. In circuit 520, $V_{OH}$ is sampled by a pass gate formed by PMOS transistor 522 and NMOS transistor 524 responsive to current control evaluation signals $NCC_{EVAL}$ and $CC_{EVAL}$, respectively. Likewise, $V_{OL}$ is sampled by a pass gate formed by PMOS transistor 540 and NMOS transistor 542. Responsive to the current control evaluation signals, current flows from $V_{OH}$ through resistors 526 and 536 to a circuit node at a non-inverting terminal of amplifier 560. The current flows further on through resistors 544 and 558 to $V_{OL}$, responsive to the current control evaluation signals, in order to form a midrange voltage level $V_{MID}$. Amplifier 560 compares $V_{MID}$ to $V_{REF}$ in order to generate a current control signal.

Current sampling circuit 520 experiences a variety of difficulties. First, there are device asymmetry problems involved with the PMOS and NMOS transistors. Typically, one device is turned on strongly while the other is turned on weakly responsive to the same voltage conditions. Also, the addition of these devices introduces additional resistance and capacitance at the bus terminations from which $V_{OH}$ and $V_{OL}$ are obtained. This contributes to increased settling time for signals on these bus terminations. Furthermore, the current flow from $V_{OH}$ and $V_{OL}$ creates a loading problem at these bus terminations.

Note also that pass gate transistors 530 and 532 may be activated responsive to offset control signals NAOFFSET and AOFFSET to cause current to also flow through resistor 534 to add offset voltage to $V_{MID}$. Likewise, pass gate transistors 550 and 552 may be activated responsive to offset control signals NROFFSET and ROFFSET to cause current to also flow through resistor 556 to reduce the offset voltage provided to $V_{MID}$. These pass gates also suffer from asymmetry problems and add capacitive delay to the system.

Figure 16:
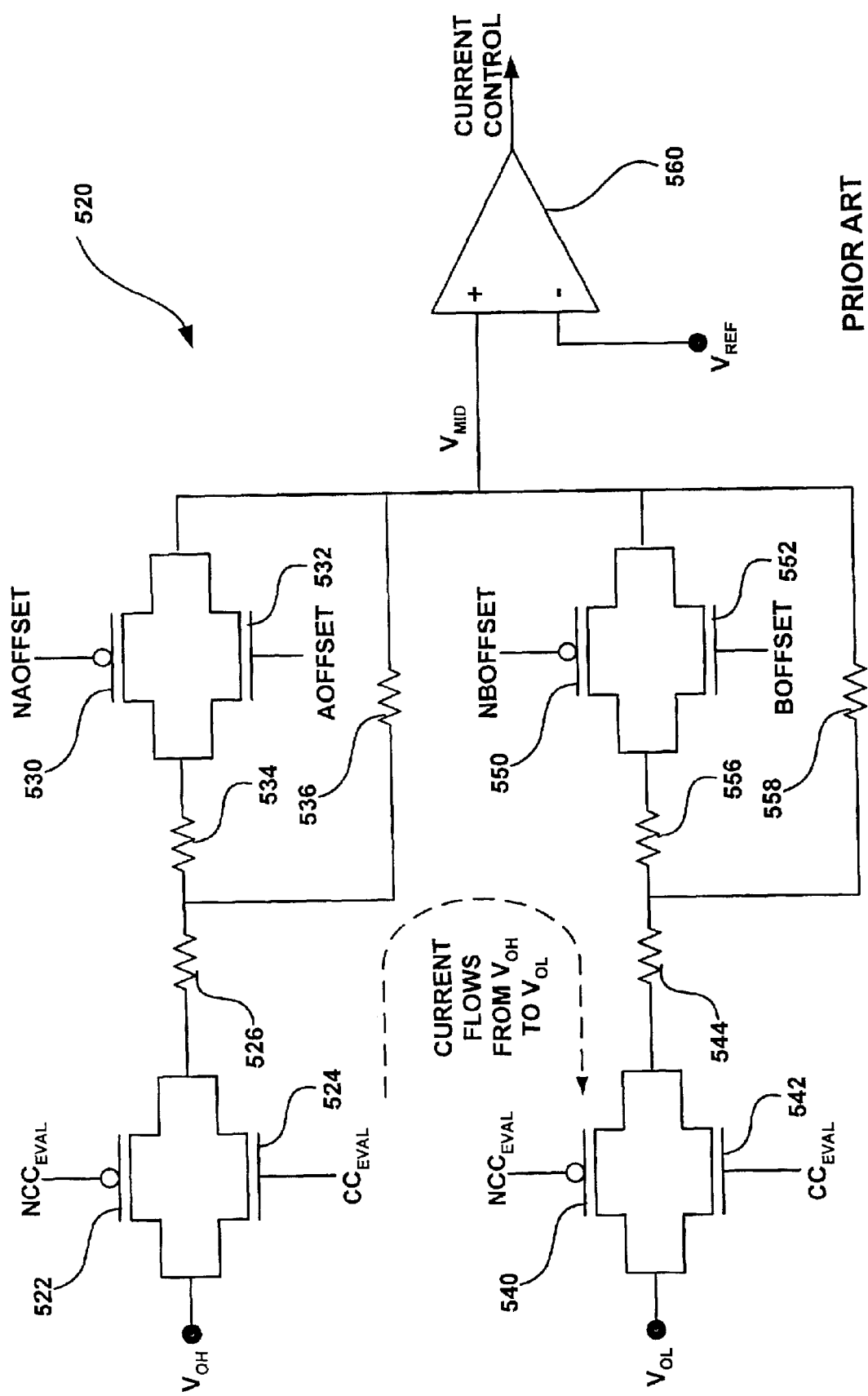
FIG. 16 is a functional block diagram illustrating an example of one implementation of the conventional circuit of FIG. 4 utilizing pass gates to control sampling.
Figure 17:
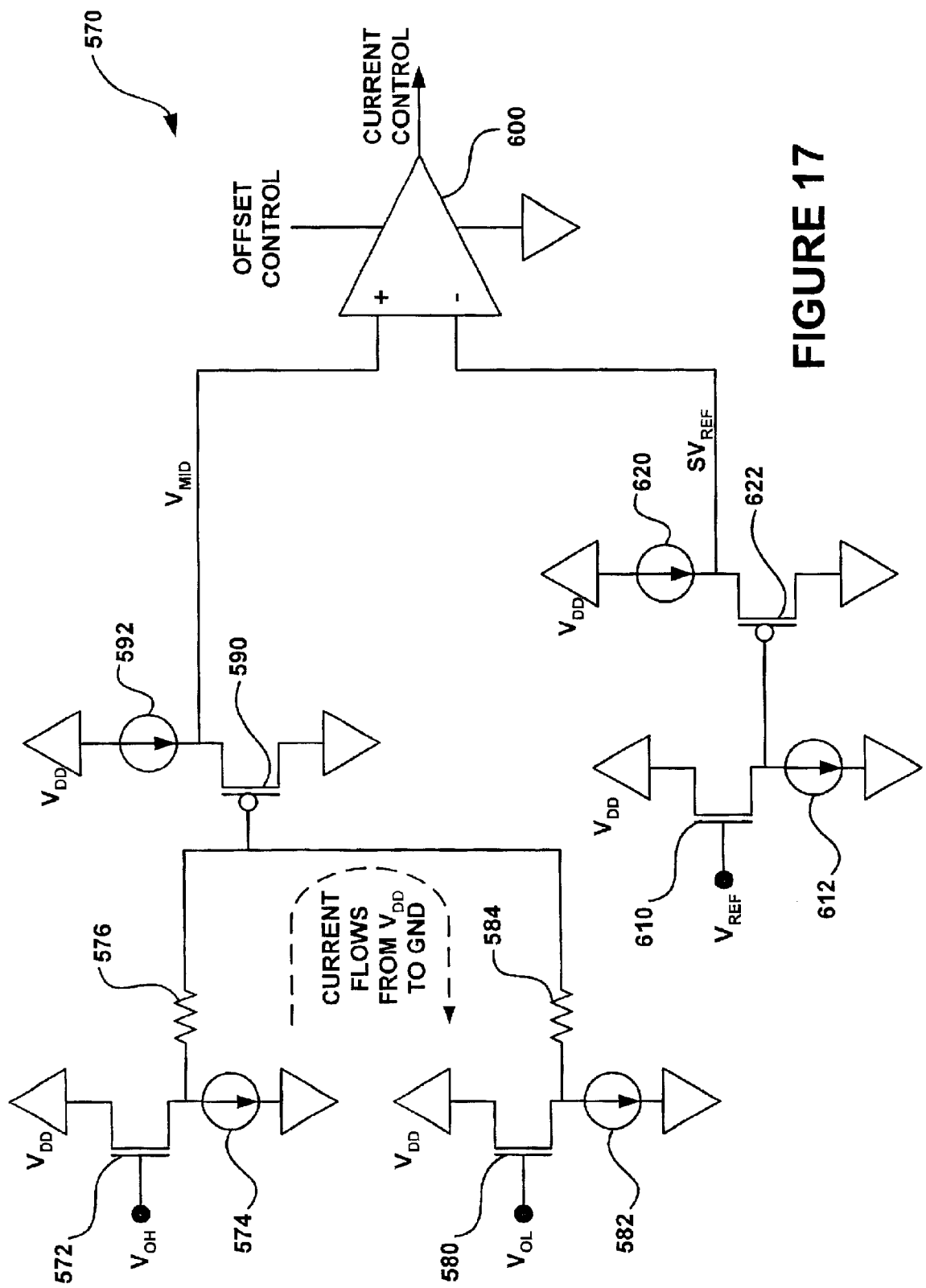
FIG. 17 is a functional block diagram illustrating an embodiment of a current sampling circuit utilizing pass gates according to one aspect of the present invention.

FIG. 17 illustrates an embodiment of a current sample circuit 570 according to one aspect of the present invention that addresses some of the problems encountered with the circuit of FIG. 16. In circuit 570, the gate of NMOS transistor 572 is coupled to a bus terminal from which $V_{OH}$ is sampled while the gate of NMOS transistor 580 is coupled to a bus terminal from which $V_{OL}$ is sampled. Because transistor 572 is a MOS transistor that draws no current through its gate, transistor 572 is charge coupled for capacitively coupled to the bus terminal. Transistor 572 is coupled in series with current source 574 between a $V_{DD}$ power supply terminal and a ground terminal. Likewise, transistor 580 is coupled in series with current source 582 between the $V_{DD}$ power supply terminal and the ground terminal. The source of transistor 572 is coupled to the gate of PMOS transistor 590 through resistor 576 while the source of transistor 580 is coupled to the gate of PMOS transistor 590 through resistor 584.

Transistor 590 is coupled in series with current source 592 between the $V_{DD}$ power supply terminal and the ground terminal. The voltage produced at the gate of transistor 590 is stepped up by the transistor threshold voltage of transistor 590 to obtain the midrange voltage $V_{MID}$ at the source of transistor 590, which is input to the non-inverting terminal of comparator amplifier 600. Transistor 590 upshifts the sampled voltage by one threshold level to compensate for the voltage downshift introduced by transistors 572 and 580.

In circuit 570, $V_{REF}$ drives the gate of NMOS transistor 610, which is coupled in series with current source 612 between the $V_{DD}$ power supply terminal and the ground terminal. The source of transistor 610, in turn, is coupled to the gate of PMOS transistor 622, which is coupled in series with current source 620 between the $V_{DD}$ power supply terminal and the ground terminal. The source of transistor 622 is coupled to the inverting input terminal of comparator amplifier 600 to provide a buffered reference signal $SV_{REF}$.

In current sampling circuit 570, the current flowing through transistors 572 and 580 and, consequently, the voltage at the gate of transistor 590 is determined by $V_{OH}$ and $V_{OL}$. However, the current drawn by this circuit is drawn from $V_{DD}$, not the terminals providing $V_{OH}$ and $V_{OL}$. Likewise, transistor 610 draws current from $V_{DD}$ and not from the terminal providing $V_{REF}$. Thus, circuit 570 provides less bus loading on these terminals because essentially no current is drawn through the gate terminals of the transistors 572, 580 and 610. Along the same lines, the only capacitance introduced to the external terminals is from the gate terminals of the transistors 572, 580 and 610, which is significantly less than the capacitance introduced by circuit 520 of FIG. 16.

Note that in current sampling circuit 570, transistors 572, 580 and 610 are MOS transistors that effectively draw no current through their gates. Thus, these transistors may be viewed as being charge coupled or capacitively coupled to their respective bus terminals so that they draw virtually no current, which reduces the loading on these bus terminals.

Figure 18:
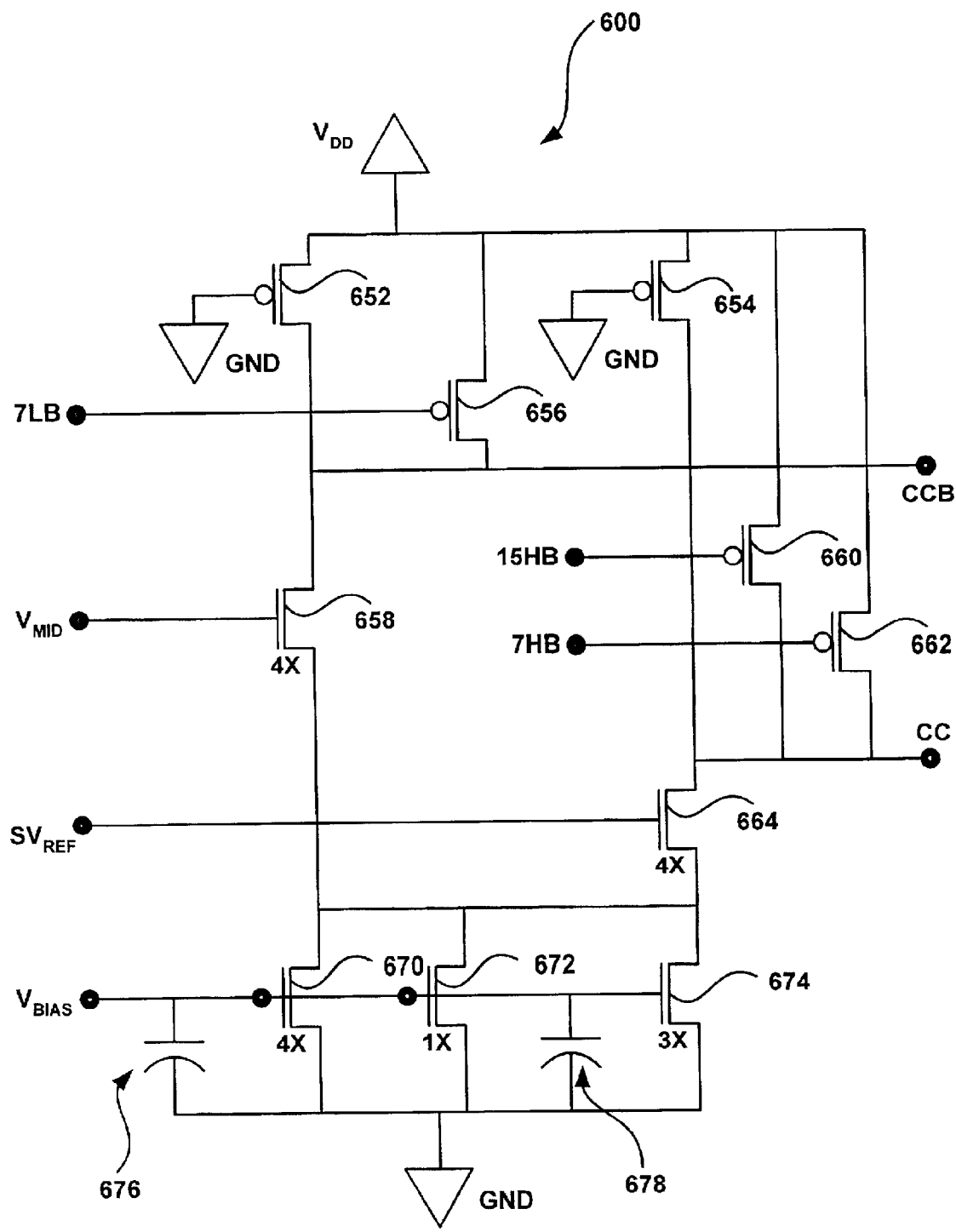
FIG. 18 is a functional block diagram illustrating an embodiment of a current control circuit for controlling the offset current in the amplifier of FIG. 17.

Furthermore, note that current control circuit 570 includes comparator amplifier 600, which features integrated offset control. FIG. 18 is a functional block diagram illustrating one embodiment of comparator amplifier 600. In FIG. 18, amplifier 600 includes a differential pair of NMOS transistors 658 and 664. Midrange voltage signal $V_{MID}$ drives the gate of transistor 658 while buffered reference voltage signal $SV_{REF}$ drives the gate of transistor 664. NMOS transistor 658 is coupled in series with PMOS transistor 652 and NMOS transistor 670 between the $V_{DD}$ power supply terminal and the ground terminal. Likewise, NMOS transistor 664 is coupled in series with PMOS transistor 654 and NMOS transistor 674 between the $V_{DD}$ power supply terminal and the ground terminal.

The gates of PMOS transistors 652 and 654 are coupled to the ground terminal such that the transistors operate as resistive loads. The gates of NMOS transistors 670 and 674 are driven by a bias voltage $V_{BIAS}$ such that the transistors operate as current sources. Another NMOS transistor 672 operates as a current source that is shared by both differential pairs. Capacitors 676 and 678 are coupled between the terminal that receives $V_{BIAS}$ and the ground terminal, where these capacitors may be fabricated as NMOS transistors having their source and drain terminals coupled to the ground terminal and their gate terminals coupled to the terminal that receives $V_{BIAS}$.

An inverted current control signal CCB is generated at the drain of NMOS transistor 658. A PMOS transistor 656 is coupled between the drain of NMOS transistor 658 and the $V_{DD}$ power supply terminal. The gate of PMOS transistor 656 is driven by an inverted seven percent lower offset control signal 7LB and, when activated, is configured to offset the current control signal by seven percent lower by supplying more current from the $V_{DD}$ power supply terminal to CCB.

A non-inverted current control signal CC is generated at the drain of NMOS transistor 664. A pair of PMOS transistors 660 and 662 are coupled between the drain of NMOS transistor 664 and the $V_{DD}$ power supply terminal, where transistor 660 has a larger channel than transistor 662. The gate of transistor 660 is driven by an inverted fifteen percent higher offset control signal 15HB and, when activated, is configured to offset the current control signal by fifteen percent higher by supplying more current from the $V_{DD}$ power supply terminal to CCB. The gate of PMOS transistor 662 is driven by an inverted seven percent higher offset control signal 7HB and, when activated, is configured to offset the current control signal by seven percent higher by supplying more current from the $V_{DD}$ power supply terminal to CCB.

The differential pair form by NMOS transistors 658 and 664 operate to compare $V_{MID}$ to $SV_{REF}$ in order to generate the current control signals CCB and CC. The offset control signals 7LB, 7HB and 15HB, which are provided by another control circuit that is well known in the art, adjust the current control signals CCB and CC to provide offset. The current control signals CCB and CC, in turn, provide the current control signal that operates as described above, such as driving latch 164 of FIG. 4, to control the current of the circuit.

By integrating the offset control into comparator amplifier 600, less capacitance and loading are introduced at the external bus terminals. Further, the circuit of FIG. 18 is simpler and provides better tracking performance with less device asymmetry problems.

Figure 19:
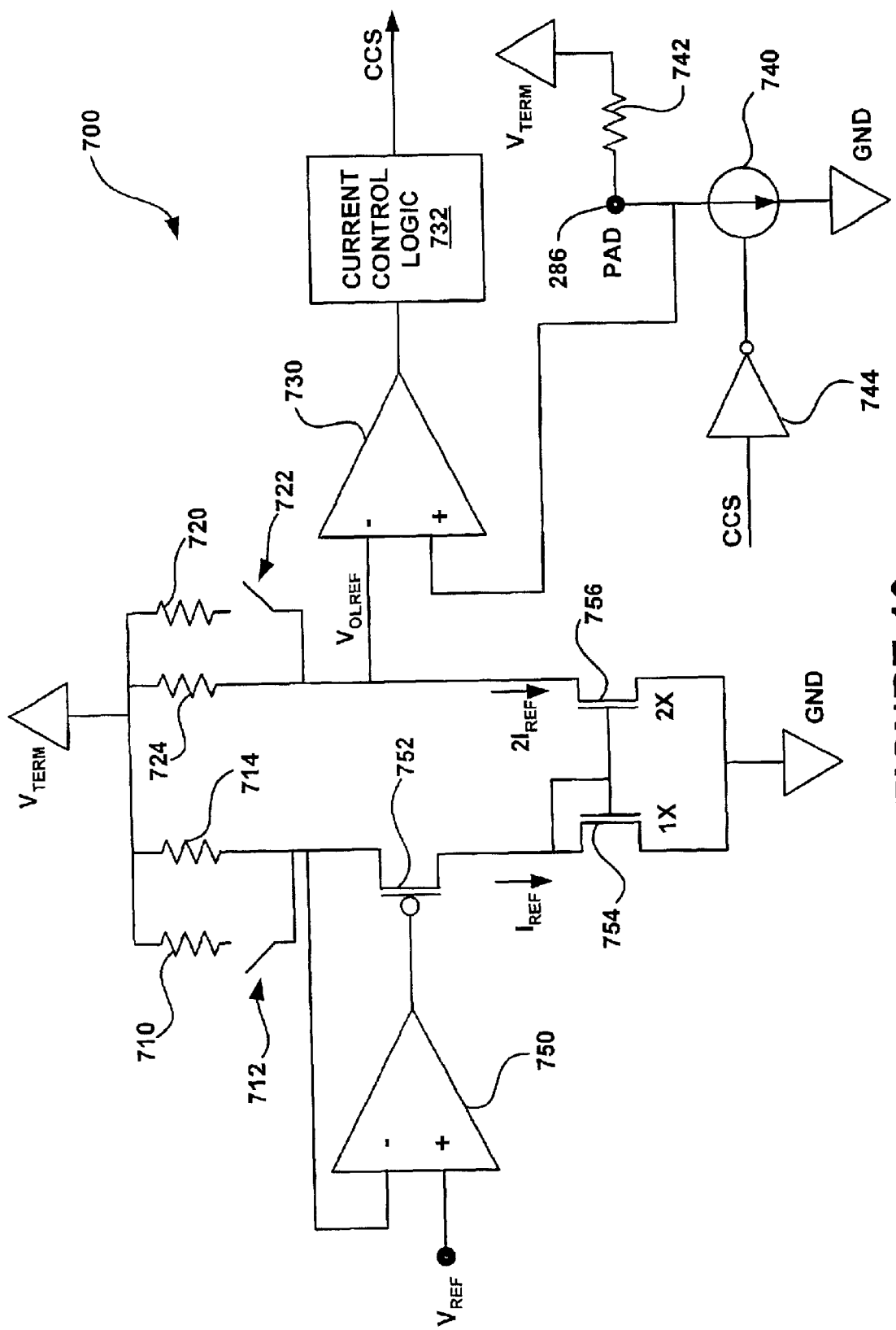
FIG. 19 is a functional block diagram illustrating an embodiment of a reference generating circuit according to one aspect of the present invention, this embodiment being an alternative approach to the circuits of FIGS. 7, 8 and 9, where a reference voltage is converted to a current reference and back to another reference voltage.

FIG. 19 is a functional block diagram illustrating a CMOS based embodiment of a voltage to current conversion circuit 700 that represents an alternative to the embodiments shown in FIGS. 7, 8 and, particularly, 9 for converting $V_{REF}$ to a reference current. In circuit 700, $V_{REF}$ is input to the non-inverting terminal of amplifier 750 and the output amplifier 750 drives the gate of PMOS transistor 752. The source of PMOS transistor 752 is coupled back to the inverting input of amplifier 750 to provide a feedback control loop. Amplifier 750 in combination with PMOS transistor 752 operate to convert $V_{REF}$ to reference current $I_{REF}$.

PMOS transistor 752 is coupled in series with resistor 714 and NMOS transistor 754 between a terminal for receiving $V_{TERM}$ and the ground supply terminal. Resistor 714 provides a resistive load that may be adjusted for offset control by, for example, closing switch 712 to engage resistor 710.

NMOS transistor 754 is unit sized device that is diode connected and cross coupled with 2X sized NMOS transistor 756. Thus, reference current $I_{REF}$ is doubled in transistor 756 due to the size relationship between transistors 756 and 754.

NMOS transistor 756 is coupled in series with resistor 724 between the terminal for receiving $V_{TERM}$ and the ground supply terminal. Resistor 724 provides a resistive load that may be adjusted for offset control by, for example, closing switch 722 to engage resistor 720.

The output low reference voltage $V_{OLREF}$ is produced at the drain of transistor 756 and is input to the inverting input of amplifier 730, which drives current control logic 732 to produce a current control signal CCS. Current control logic 732, in this example, includes a latch circuit similar to latch 164 shown in FIG. 4, that captures the current control signal level in response to a evaluation control signal, such as $CC_{EVAL}$. The current control signal CCS, in turn, drives inverter 744 that drives a current source 740, similar to that shown above in FIG. 3, that sinks current from external pad 286 to the ground terminal.

The non-inverting input of comparator 730 is coupled to external pad 286 such that amplifier 730 compares the voltage at the external pad 286 with the signal produced by 2 $I_{REF}$ at the inverting input of comparator 730. The output of comparator 730 drives current control logic 732 which, in turn, controls the amount of current that current source 740 sinks in order to adjust for the value of external resistor 742 coupled between $V_{TERM}$ and external pad 286.

In voltage to current conversion circuit 700, the amplification of the current reference circuit is obtained using a current mirror with the mirror transistor 756 being larger than the primary transistor 754 to multiply the current signal. This approach eliminates the need for a CMOS amplifier stage, such as the amplifier 330 shown in FIG. 9, which typically has poor gain characteristics and may introduce additional error.

The present invention provides an improved bus interface driver that compares $V_{TERM}$ and $V_{REF}$ in order to provide current control rather than comparing $V_{REF}$ to a ground voltage level, which may be subject to greater variation. Further, the present invention may be applied to both single ended output drivers and to differential output drivers that provide a balanced bus signal. Still further, in one aspect of the present invention, an integrating sampler may be utilized to average the drive current through an "on" cycle. Yet another aspect of the present invention may be utilized to compensate for a range of external impedances and for a range of $V_{OL}$ and $V_{TERM}$ voltages.

It should be understood that the present invention is not limited to the circuits, methods and systems described herein. The performance of various types of circuits and systems may be improved through the application of the teachings described herein.

In view of the wide variety of embodiments to which the principles of the present invention can be applied, it should be understood that the illustrated embodiments are exemplary only, and should not be taken as limiting the scope of the present invention. For example, the circuits may employ different types of transistors and amplifiers to obtain the functions described above and the functions may be achieved with more or fewer elements that those illustrated above. Further, some elements of the embodiments described may be implemented in software, hardware, firmware, or a combination of these approaches. Further, it will be apparent to those of ordinary skill in the art that the teachings of the present invention may be applied to other systems besides RAMBUS based data busses.

The claims should not be read as limited to the described order or elements unless stated to that effect. Therefore, all embodiments that come within the scope and spirit of the following claims and equivalents thereto are claimed as the invention.

What is claimed is:

1. A bus interface driver circuit, the circuit comprising:
   an external termination pad configured to be coupled to a bus line, the bus line having a termination voltage and a termination impedance;
   a first comparator circuit configured to compare the termination voltage to a first reference voltage in order to generate a second reference voltage;
   a first current source circuit configured to receive the second reference voltage and generate a reference current that corresponds to the second reference voltage;
   a driver circuit configured to receive the reference current and a data signal, where the driver circuit is configured to modulate the reference current responsive to the data signal in order to generate an output current at the external termination pad;
   a second comparator circuit configured to compare the termination voltage to the first reference voltage in order to generate a third reference voltage and further compare the third reference voltage to an output voltage at the external termination pad in order to generate a current control signal; and
   a second current source configured to receive the current control signal and generate an on-die termination current corresponding to the current control signal at the external termination pad.

2. The bus interface driver circuit of claim 1, where the first comparator circuit further comprises:
   a first operational amplifier having first and second input terminals and an output terminal, the first input terminal of the first operational amplifier being coupled to a circuit node configured to have one of the terminating voltage and the first reference voltage and where the output terminal of the first operational amplifier is coupled to the second input terminal of the first operational amplifier; and
   a resistance circuit coupled between the second input terminal of the first operational amplifier and another circuit node configured to have another one of the terminating voltage and the first reference voltage.

3. The bus interface driver circuit of claim 1, where the resistance circuit further comprises a first resistor in series with a selectable resistance circuit.

4. The bus interface driver circuit of claim 2, where the first current source circuit further comprises:
   a first transistor having first and second current terminals and a control terminal, where the control terminal of the first transistor is coupled to the output of the first comparator and the second current terminal of the first transistor is coupled to the second input terminal of the first comparator;
   a second transistor having first and second current terminals and a control terminal, where the control terminal of the second transistor is coupled to the second current terminal of the second transistor, the second current terminal of the second transistor is coupled to the first current terminal of the first transistor, and the first current terminal of the second transistor is coupled to a circuit node configured to have one of the terminating voltage and a first supply voltage; and a third transistor having first and second current terminals and a control terminal, where the control terminal of the third transistor is coupled to the control terminal of the second transistor, the first current terminal of the third transistor is coupled to the circuit node configured to have one of the terminating voltage and a first supply voltage, and the second current terminal of the second transistor is configured to generate the reference current.

5. The bus interface driver circuit of claim 2, where the driver circuit further comprises a differential amplifier having a current supply terminal for receiving the reference current, a non-inverting output coupled to the external termination pad, and an inverting output coupled to another external termination pad configured to be coupled to another bus line, a first input for receiving the data signal and a second input for receiving an inverted data signal, where the differential amplifier is configured to modulate the reference current in a complementary manner responsive to the data signal and the inverted data signal in order to generate the output current at the non-inverting output and an inverted output current at the inverted output.

6. The bus interface driver circuit of claim 5, where the differential amplifier further includes:
a first pair of cross-coupled transistors coupled between the non-inverting output of the amplifier and a ground supply rail, where a first transistor of the first pair is configured to receive the reference current as modulated by the data signal and the second transistor of the first pair is larger than the first transistor of the first pair by a predetermined ratio; and
a second pair of cross-coupled transistors coupled between the inverting output of the amplifier and the ground supply rail, where a first transistor of the second pair is configured to receive the reference current as modulated by the inverted data signal and the second transistor of the second pair is larger than the first transistor of the second pair by the predetermined ratio.

7. The bus interface driver circuit of claim 5, where the differential amplifier further includes:
a first complex impedance coupled between the non-inverting output of the amplifier and a control terminal of the second transistor of the first pair; and
a second complex impedance coupled between the inverting output of the amplifier and a control terminal of the second transistor of the second pair.

8. The bus interface driver circuit of claim 2, where the driver circuit further comprises a single ended amplifier having a current supply terminal for receiving the reference current, a non-inverting output coupled to the external termination pad, and a first input for receiving the data signal, where the single ended amplifier is configured to modulate the reference current responsive to the data signal in order to generate the output current at the non-inverting output.

9. The bus interface driver circuit of claim 8, where the single ended amplifier further includes a pair of cross-coupled transistors coupled between the non-inverting output of the amplifier and a ground supply rail, where a first transistor of the pair is configured to receive the reference current as modulated by the data signal and the second transistor of the pair is larger than the first transistor of the pair by a predetermined ratio.

10. The bus interface driver circuit of claim 9, where the single ended amplifier further includes a complex impedance coupled between the non-inverting output of the amplifier and a control terminal of the second transistor of the pair.

11. The bus interface driver circuit of claim 1, where the second comparator circuit further comprises:
a second operational amplifier having first and second input terminals and an output terminal, the first input terminal of the second amplifier being coupled to a circuit node configured to have one of the terminating voltage and the first reference voltage;
a first resistor coupled between the second input terminal of the second operational amplifier and another circuit node configured to have another one of the terminating voltage and the first reference voltage;
a resistance circuit coupled between the output terminal of the second operational amplifier and the second input terminal of the second operational amplifier;
a third operational amplifier having first and second input terminals and an output terminal, the first input terminal of the third amplifier being coupled to the output terminal of the second operational amplifier and the second input of the third being coupled to the external termination pad; and
a current logic control circuit having an input terminal coupled to the output terminal of the third operational amplifier and an output terminal for outputting the current control signal, where the current logic control circuit is configured to transform an output signal from the third operational amplifier into the current control signal in a form suitable for driving the second current source.

12. The bus interface driver circuit of claim 11, where:
the current control signal further comprises a digital signal having a plurality of bit lines;
the second current source further comprises a plurality of transistors, each coupled between a circuit node, the circuit node being configured to have one of the terminating voltage and a supply voltage, and the external termination pad and each having a control terminal coupled to a corresponding one of the plurality of bit lines of the current control signal; and
the current logic circuit is configured to drive each one of the plurality of bit lines of the current control signal responsive to the output of the third operational amplifier to selectively activate the plurality of bit lines of the current control signal in order to generate the on-die termination current.

13. The bus interface driver circuit of claim 11, where:
the current control signal further comprises an analog signal;
the second current source further comprises a plurality of transistors, each coupled between a circuit node, the circuit node being configured to have one of the terminating voltage and a supply voltage, and the external termination pad and each having a control terminal coupled to the output of the current logic circuit; and
the current logic circuit is configured to drive each of the plurality of transistors of the second current source in a linear operating range responsive to the output of the third operational amplifier in order to generate the on-die termination current.

14. The bus interface driver circuit of claim 11, where the second comparator circuit further includes:
a transmit pipeline circuit configured to transmit a predetermined data pattern at the external termination pad responsive to a transmit clock signal, the predetermined data pattern alternating between high and low logic voltage levels;

a receive pipeline configured to receive, responsive to a receive clock signal, a data pattern at the external termination pad corresponding to the predetermined data pattern transmitted by the transmit pipeline circuit;

a comparator configured to compare the received data pattern to the predetermined data pattern in order to generate a counter control signal configured to increase and decrease the current control signal according to the comparison between the received data pattern and the predetermined data pattern.

15. A method for interfacing to a bus, the method comprising the steps of:

providing an external termination pad configured to be coupled to a bus line;

tracking a difference between a terminating voltage for the bus and a first reference voltage for the bus to produce a second reference voltage;

generating a reference current that corresponds to the second reference voltage;

sourcing the reference current to an amplifier;

amplifying a data signal with the amplifier to drive the external termination pad;

generating a current control signal by comparing a voltage at the external termination pad to the second reference voltage; and sourcing an on-die termination current to the external termination pad that corresponds to the current control signal.

16. The method of claim 15, where the step of tracking a difference between a terminating voltage for the bus and a first reference voltage for the bus to produce a second reference voltage further comprises:

scaling one of the terminating voltage and the first reference voltage using a resistance circuit;

comparing another of the terminating voltage and the first reference voltage to the scaled one to obtain a difference signal; and where the step of sourcing the reference current to an amplifier includes driving a current source with the difference signal through the resistance circuit to the one of the terminating voltage and the first reference voltage.

17. The method of claim 16, where the method includes the step of controlling an output swing of the amplifier by providing a selectably adjustable resistance in the resistance circuit.

18. The method of claim 16, where the step of sourcing the reference current to an amplifier includes mirroring the current through the current source to produce the reference current.

19. The method of claim 15, where the step of amplifying a data signal with the amplifier to drive the external termination pad includes the steps of:

modulating the reference current with the data signal to produce a modulated current signal;

sinking the modulated current signal through a first transistor;

cross-coupling a second transistor with the first transistor, where a size of the second transistor is a predetermined ratio to a size of the first transistor; and sinking current from the external termination pad using the second transistor.

20. The method of claim 19, the method further including the step of coupling a complex impedance between the external termination pad and a control terminal of the second transistor to control the slew rate of the amplifier.

21. The method of claim 15, where the step of amplifying a data signal with the amplifier to drive the external termination pad includes the steps of:

modulating the reference current with the data signal to produce a modulated current signal;

sinking the modulated current signal through a first transistor of a first pair;

cross-coupling a second transistor of the first pair with the first transistor of the first pair, where a size of the second transistor of the first pair is a predetermined ratio to a size of the first transistor of the first pair;

sinking current from the external termination pad using the second transistor of the first pair;

modulating the reference current with an inverted data signal, which is complementary to the data signal, to produce an inverted modulated current signal;

sinking the inverted modulated current signal through a first transistor of a second pair;

cross-coupling a second transistor of the second pair with the first transistor of the second pair, where a size of the second transistor of the second pair is the predetermined ratio to a size of the first transistor of the second pair; and sinking current from an inverted external termination pad using the second transistor of the second pair.

22. The method of claim 21, the method further including the step of coupling a first complex impedance between the external termination pad and a control terminal of the second transistor of the first pair and coupling a second complex impedance between the inverted external termination pad and a control terminal of the second transistor of the second pair to control the slew rate of the amplifier.

23. The method of claim 15, where the step of generating a current control signal by comparing a voltage at the external termination pad to the second reference voltage further comprises the steps of:

comparing the voltage at the external termination pad to the second reference voltage to produce an up/down signal; and using the up/down signal to increase or decrease the current control signal.

24. The method of claim 23, where the step of comparing the voltage at the external termination pad to the second reference voltage to produce an up/down signal further includes:

scaling one of the terminating voltage and the first reference voltage using a resistance circuit; and comparing another of the terminating voltage and the first reference voltage to the scaled one to obtain the second reference voltage.

25. The method of claim 24, where the step of scaling one of the terminating voltage and the first reference voltage using another resistance circuit further includes the step of controlling an output swing of the amplifier by providing a selectably adjustable resistance in the resistance circuit.

26. The method of claim 23, where:

the step of using the up/down signal to increase or decrease the current control signal further includes increasing and decreasing a digital value of the current control signal responsive to the up/down signal; and the step of sourcing an on-die termination current to the external termination pad that corresponds to the current control signal includes:

providing a plurality of transistors for sourcing current to the external termination pad, and driving a control gate of each of the plurality of transistors with a corresponding bit of the digital value of the current control signal.

27. The method of claim 23, where:

the step of using the up/down signal to increase or decrease the current control signal further includes increasing and decreasing an analog value of the current control signal responsive to the up/down signal; and the step of sourcing an on-die termination current to the external termination pad that corresponds to the current control signal includes:

providing a plurality of transistors for sourcing current to the external termination pad, and driving a control gate of each of the plurality of transistors with the analog value of the current control signal to operate the plurality of transistors in a linear operating range.

28. The method of claim 15, where the step of generating a current control signal by comparing a voltage at the external termination pad to the second reference voltage further comprises the steps of:

transmitting a predetermined data pattern at the external termination pad responsive to a transmit clock signal, the predetermined data pattern alternating between high and low logic voltage levels;

receiving, responsive to a receive clock signal, a data pattern at the external termination pad corresponding to the transmitted predetermined data pattern; and comparing the received data pattern to the predetermined data pattern in order to generate an up/down signal configured to increase and decrease the current control signal according to the comparison between the received data pattern and the predetermined data pattern.

29. A device for interfacing to a bus through an external termination pad, the device comprising:

means for tracking a difference between a terminating voltage for the bus and a first reference voltage for the bus to produce a second reference voltage;

means for generating a reference current that corresponds to the second reference voltage;

means for sourcing the reference current to an amplifier;

means for amplifying a data signal with the amplifier to drive the external termination pad;

means for generating a current control signal by comparing a voltage at the external termination pad to the second reference voltage; and means for sourcing an on-die termination current to the external termination pad that corresponds to the current control signal.

30. The device of claim 29, where the means for tracking a difference between a terminating voltage for the bus and a first reference voltage for the bus to produce a second reference voltage further comprises:

means for scaling one of the terminating voltage and the first reference voltage using a resistance circuit;

means for comparing another of the terminating voltage and the first reference voltage to the scaled one to obtain a difference signal; and where the means for sourcing the reference current to an amplifier includes means for driving a current source with the difference signal through the resistance circuit to the one of the terminating voltage and the first reference voltage.

31. The device of claim 30, where the device further includes means for controlling an output swing of the amplifier by providing a selectably adjustable resistance in the resistance circuit.

32. The device of claim 30, where the means for sourcing the reference current to an amplifier includes means for mirroring the current through the current source to produce the reference current.

33. The device of claim 29, where the means for amplifying a data signal with the amplifier to drive the external termination pad includes:

means for modulating the reference current with the data signal to produce a modulated current signal;

means for sinking the modulated current signal through a first transistor;

means for multiplying the modulated current signal by cross-coupling a second transistor with the first transistor, where a size of the second transistor is a predetermined ratio to a size of the first transistor; and means for sinking current from the external termination pad using the second transistor.

34. The device of claim 33, the device further including means for controlling a slew rate of the amplifier by introducing a complex impedance between the external termination pad and a control terminal of the second transistor.

35. The device of claim 29, where the means for amplifying a data signal with the amplifier to drive the external termination pad includes:

means for modulating the reference current with the data signal to produce a modulated current signal;

means for sinking the modulated current signal through a first transistor of a first pair;

means for multiplying the modulated current signal by cross-coupling a second transistor of the first pair with the first transistor of the first pair, where a size of the second transistor of the first pair is a predetermined ratio to a size of the first transistor of the first pair;

means for sinking current from the external termination pad using the second transistor of the first pair;

means for modulating the reference current with an inverted data signal, which is complementary to the data signal, to produce an inverted modulated current signal;

means for sinking the inverted modulated current signal through a first transistor of a second pair;

means for multiplying for multiplying the inverted modulated current signal by cross-coupling a second transistor of the second pair with the first transistor of the second pair, where a size of the second transistor of the second pair is the predetermined ratio to a size of the first transistor of the second pair; and means for sinking current from an inverted external termination pad using the second transistor of the second pair.

36. The device of claim 35, the device further including means for controlling the slew rate of the amplifier by coupling a first complex impedance between the external termination pad and a control terminal of the second transistor of the first pair and coupling a second complex impedance between the inverted external termination pad and a control terminal of the second transistor.

37. The device of claim 29, where the means for generating a current control signal by comparing a voltage at the external termination pad to the second reference voltage further comprises:
  means for comparing the voltage at the external termination pad to the second reference voltage to produce an up/down signal; and
  means for using the up/down signal to increase or decrease the current control signal.

38. The device of claim 37, where the means for comparing the voltage at the external termination pad to the second reference voltage to produce an up/down signal further includes:
  means for scaling one of the terminating voltage and the first reference voltage using a resistance circuit; and
  means for comparing another of the terminating voltage and the first reference voltage to the scaled one to obtain the second reference voltage.

39. The device of claim 38, where the means for scaling one of the terminating voltage and the first reference voltage using another resistance circuit further includes means for controlling an output swing of the amplifier by providing a selectably adjustable resistance in the resistance circuit.

40. The device of claim 37, where:
  the means for using the up/down signal to increase or decrease the current control signal further includes means for increasing and decreasing a digital value of the current control signal responsive to the up/down signal; and
  the means for sourcing an on-die termination current to the external termination pad that corresponds to the current control signal includes:
    means for providing a plurality of transistors for sourcing current to the external termination pad, and
    means for driving a control gate of each of the plurality of transistors with a corresponding bit of the digital value of the current control signal.

41. The device of claim 37, where:
  the means for using the up/down signal to increase or decrease the current control signal further includes means for increasing and decreasing an analog value of the current control signal responsive to the up/down signal; and
  the means for sourcing an on-die termination current to the external termination pad that corresponds to the current control signal includes:
    means for providing a plurality of transistors for sourcing current to the external termination pad, and
    means for driving a control gate of each of the plurality of transistors with the analog value of the current control signal to operate the plurality of transistors in a linear operating range.

42. The device of claim 29, where the means for generating a current control signal by comparing a voltage at the external termination pad to the second reference voltage further comprises:
  means for transmitting a predetermined data pattern at the external termination pad responsive to a transmit clock signal, the predetermined data pattern alternating between high and low logic voltage levels;
  means for receiving, responsive to a receive clock signal, a data pattern at the external termination pad corresponding to the transmitted predetermined data pattern; and
  means for comparing the received data pattern to the predetermined data pattern in order to generate an up/down signal configured to increase and decrease the current control signal according to the comparison between the received data pattern and the predetermined data pattern.

43. A bus system, the bus system including:
  at least one bus line;
  a termination voltage terminal coupled to the bus line and configured to have an external termination voltage;
  a termination resistor coupled between the termination voltage terminal and the bus line and having an external resistance value; and
  a bus interface device having an external termination pad coupled to the bus line, the bus interface device being configured to receive the termination voltage and an external reference voltage and compare the termination voltage and an external reference voltage in order to generate an output low reference voltage, the device being further configured to compare the output low reference voltage to a voltage at the external termination pad in order to generate a current control signal, where the device includes a current source configured to source current to the external termination pad responsive to the current control signal.

44. The bus system of claim 43, where the bus interface device is further configured to generate a reference current corresponding to the output low reference voltage and the device further includes an amplifier for generating an output signal at the external termination pad responsive to a data signal, where the amplifier operates from the reference current such that an output swing of the output signal of the amplifier corresponds to the output low reference voltage.

45. The bus system of claim 44, where the bus interface device further includes a scaling circuit for selectably adjusting the output low reference voltage in order to introduce asymmetry to the output swing of the output signal of the amplifier.

46. The bus system of claim 43, where the bus interface device is further configured to generate the current control signal by transmitting a predetermined data pattern at the external termination pad, where the predetermined data pattern alternates between high and low logic levels, compare a signal present at the external termination pad to the output low reference voltage in order to obtain a received data pattern that corresponds to the transmitted predetermined data pattern, and compare the received data pattern to the predetermined data pattern in order to adjust the current control signal.

47. A current control circuit for a bus interface, the circuit comprising:
  a first transistor having first and second current terminals and a control terminal, the first current terminal of the first transistor being coupled to a first power supply terminal and the control terminal of the first transistor being coupled to a circuit node configured to receive a first sampled logic voltage;
  a first current source being coupled between the second current terminal of the first transistor and a second power supply terminal;
  a second transistor having first and second current terminals and a control terminal, the first current terminal of the second transistor being coupled to the first power supply terminal and the control terminal of the second transistor being coupled to a circuit node configured to receive a second sampled logic voltage;
  a second current source being coupled between the second current terminal of the second transistor and the second power supply terminal;

a third transistor having first and second current terminals and a control terminal, the second current terminal of the third transistor being coupled to the second power supply terminal;

a first resistor coupled between the control terminal of the third transistor and the second current terminal of the first transistor;

a second resistor coupled between the control terminal of the third transistor and the second current terminal of the second transistor;

a third current source being coupled between the first current terminal of the third transistor and the first power supply terminal;

a fourth transistor having first and second current terminals and a control terminal, the first current terminal of the fourth transistor being coupled to the first power supply terminal and the control terminal of the fourth transistor being coupled to a first external termination pad configured to receive a reference voltage;

a fourth current source being coupled between the second current terminal of the fourth transistor and the second power supply terminal;

a fifth transistor having first and second current terminals and a control terminal, the second current terminal of the fifth transistor being coupled to the second power supply terminal and the control terminal of the fourth transistor being coupled to the second current terminal of the fourth transistor;

a fifth current source being coupled between the first current terminal of the fifth transistor and the first power supply terminal; and a comparator having inverting and non-inverting input terminals and an output terminal, the non-inverting input terminal being coupled to the first current terminal of the third transistor and the inverting terminal being coupled to the first current terminal of the fifth transistor, where the comparator is configured to compare the voltages received at the inverting and non-inverting input terminals and output a current control signal.

48. The current control circuit of claim 47, where the first, second and fourth transistors further comprise NMOS devices and the third and fifth transistors further comprise PMOS devices.

49. The current control circuit of claim 47, where the comparator further comprises:

a sixth transistor having first and second current terminals and a control terminal, the control terminal of the sixth transistor being coupled to the non-inverting terminal of the comparator and the first current terminal of the sixth transistor being coupled to an inverting output terminal of the comparator;

a first resistive load coupled between the first power supply terminal and the first current terminal of the sixth transistor;

a sixth current source coupled between the second current terminal of the sixth transistor and the second power supply terminal;

a seventh transistor having first and second current terminals and a control terminal, the control terminal of the seventh transistor being coupled to the inverting terminal of the comparator and the first current terminal of the seventh transistor being coupled to the output terminal of the comparator;

a second resistive load coupled between the first power supply terminal and the first current terminal of the seventh transistor;

a seventh current source coupled between the second current terminal of the seventh transistor and the second power supply terminal;

an eighth current source coupled between the second current terminals of the sixth and seventh transistors and the second power supply terminal; and an eighth transistor having first and second current terminals and a control terminal, the control terminal of the eighth transistor being configured to receive a first offset control signal, the first current terminal of the eighth transistor being coupled to the first power supply terminal, and the second current terminal of the eighth transistor being coupled to one of the output terminal of the comparator and the inverted output terminal of the comparator.

50. The current control circuit of claim 47, where the comparator further includes a ninth transistor having first and second current terminals and a control terminal, the control terminal of the ninth transistor being configured to receive a second offset control signal, the first current terminal of the ninth transistor being coupled to the first power supply terminal, and the second current terminal of the ninth transistor being coupled to another one of the output terminal of the comparator and the inverted output terminal of the comparator.

51. A circuit for sensing an external resistance coupled to an external termination pad and adjusting a current drawn from the external termination pad, the circuit comprising:

an amplifier having inverting and non-inverting input terminals and an output terminal, the non-inverting input terminal being coupled to a circuit node configured to receive a reference voltage;

a first transistor having first and second current terminals and a control terminal, the control terminal of the first transistor being coupled to the output terminal of the first amplifier and the first current terminal of the first transistor being coupled to the inverting input terminal of the first amplifier;

a first resistive load coupled between the first current terminal of the first transistor and a circuit node configured to receive a termination voltage;

a second transistor having first and second current terminals and a control terminal, the control terminal of the second transistor being coupled to the first current terminal of the second transistor and the second current terminal of the first transistor and the second current terminal of the second transistor is coupled to a power supply terminal;

a third transistor having first and second current terminals and a control terminal, where the third transistor is larger than the second transistor by a selected ratio, and where the control terminal of the third transistor is coupled to the control terminal of the second transistor and the second current terminal of the third transistor is coupled to the power supply terminal;

a second resistive load coupled between the first current terminal of the third transistor and the circuit node configured to receive the termination voltage;

a comparator having inverting and non-inverting input terminals and an output terminal, the inverting input terminal being coupled to the first current terminal of the third transistor and the non-inverting input terminal being coupled to the external termination pad;

a circuit node configured to receive a reference voltage;

a current logic control circuit having an input terminal coupled to the output terminal of the comparator and an output terminal for outputting the current control signal, where the current logic control circuit is configured to transform an output signal from the comparator into a current control signal; and a current source coupled between the external termination pad and the power supply terminal, the current source being configured to receive the current control signal and conduct a current that is proportional to the current control signal.

52. A method for controlling current in a bus interface circuit, the method comprising the steps of:

charge coupling the circuit to a first node for receiving a first sampled logic voltage;

modulating a current from a first power supply terminal to a first circuit node responsive to the first sampled logic voltage;

charge coupling the circuit to a second node for receiving a second sampled logic voltage;

modulating a current from the first circuit node to a second power supply terminal responsive to the second sampled logic voltage;

stepping up a voltage at the first circuit node to create a midrange voltage;

charge coupling the circuit to a third node for receiving a reference voltage;

modulating a current from the first power supply terminal to the second power supply terminal through a second circuit node responsive to the reference voltage;

stepping up a voltage at the second circuit node to create a stepped up reference voltage; and comparing the midrange voltage and the stepped up reference voltage in order to generate a current control signal.

53. The method of claim 52, where the step of comparing the midrange voltage and the stepped up reference voltage in order to generate a current control signal further includes:

receiving a first offset signal; and sourcing current from the first power supply terminal to the current control signal to offset the current control signal.

54. A method for sensing an external resistance coupled to an external termination pad and adjusting a current drawn from the external termination pad, the method comprising the steps of:

comparing a reference voltage to a termination voltage through a first resistive load;

modulating a current between the termination voltage and a ground voltage through the first resistive load based upon the comparison to produce a first reference current;

mirroring the first reference current through a pair of transistors having a predetermined size ratio in order to produce a second reference current;

sinking the second reference current from the termination voltage through a second resistive load to produce an output low reference voltage;

comparing the output low reference voltage to a voltage at the external termination pad to produce a current control signal; and sinking current from the external termination pad to the ground voltage responsive to the current control signal.

55. The method of claim 54, the method including the step of adjusting the first and second resistive loads in order to offset the current control signal.

* * * * *